(12) United States Patent (10) Patent No.: US 12,552,454 B2
Sakagami et al. (45) Date of Patent: Feb. 17, 2026

(54) VEHICLE CONTROL DEVICE, VEHICLE, AND VEHICLE CONTROL METHOD

(71) Applicant: HONDA MOTOR CO., LTD., Tokyo (JP)

(72) Inventors: Kyohei Sakagami, Wako (JP); Masakatsu Hori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 7 days.

(21) Appl. No.: 18/782,563

(22) Filed: Jul. 24, 2024

(65) Prior Publication Data

US 2025/0033698 A1 Jan. 30, 2025

(51) Int. Cl.
| | |
|---|---|
| B62D 11/00 | (2006.01) |
| B62D 6/00 | (2006.01) |
| B62D 11/04 | (2006.01) |
| B60L 15/20 | (2006.01) |

(52) U.S. Cl.
CPC ............ *B62D 11/003* (2013.01); *B62D 6/005* (2013.01); *B62D 11/04* (2013.01); *B60L 15/2036* (2013.01); *B60L 2200/40* (2013.01); *B60L 2220/42* (2013.01); *B60L 2220/46* (2013.01); *B60L 2240/12* (2013.01); *B60L 2240/16* (2013.01); *B60L 2240/461* (2013.01); *B60L 2240/465* (2013.01); *B60Y 2200/223* (2013.01)

(58) Field of Classification Search
CPC ............ B60L 15/2036; B60L 2200/40; B60L 2220/42; B60L 2220/46; B60L 2240/12; B60L 2240/16; B60L 2240/461; B60L 2240/465; B60Y 2200/223; B62D 6/003; B62D 6/005; B62D 11/003; B62D 11/02; B62D 11/04
See application file for complete search history.

(56) References Cited

U.S. PATENT DOCUMENTS

2019/0176884 A1 6/2019 Manji et al.
2024/0239331 A1* 7/2024 Kamio .................. B60W 10/08

FOREIGN PATENT DOCUMENTS

JP 2019-106786 A 6/2019

* cited by examiner

*Primary Examiner* — Mark L. Greene
(74) *Attorney, Agent, or Firm* — Rankin, Hill & Clark LLP

(57) ABSTRACT

A vehicle control device includes a target value setting unit that sets a target vehicle speed and a target yaw rate, a correction value calculation unit that calculates, in the case it is determined that the vehicle is in an understeering state, a correction value for correcting the target vehicle speed based on a deviation, a target vehicle wheel speed setting unit that sets target vehicle wheel speeds of a left driving wheel and a right driving wheel based on the target vehicle speed, the target yaw rate, and the correction value, and a rotational speed control unit that controls a rotational speed of the left driving motor based on the target vehicle wheel speed of the left driving wheel, and controls a rotational speed of the right driving motor based on the target vehicle wheel speed of the right driving wheel.

14 Claims, 21 Drawing Sheets

VEHICLE CONTROL DEVICE, VEHICLE, AND VEHICLE CONTROL METHOD

CROSS-REFERENCE TO RELATED APPLICATIONS

This application is based upon and claims the benefit of priority from Japanese Patent Application No. 2023-122519 filed on Jul. 27, 2023, the contents of which are incorporated herein by reference.

BACKGROUND OF THE INVENTION

Field of the Invention

The present invention relates to a vehicle control device, a vehicle, and a vehicle control method.

Description of the Related Art

In JP 2019-106786 A, an electrically powered working vehicle is disclosed that is capable of turning based on a difference in a rotational speed between left and right driving wheels. The electrically powered working vehicle determines an additive control amount by adding, to a speed control amount calculated based on an operated amount of left and right steering levers, an additional control amount determined based on a turning angular velocity that is based on a turning command, and an actual angular velocity. At a time of turning, the electrically powered working vehicle causes the turning response to be enhanced by controlling the motors of the left and right driving wheels based on the additive control amount.

SUMMARY OF THE INVENTION

In the technique of JP 2019-106786 A, the motors are merely controlled based on the additive control amount obtained by adding the additional control amount to the speed control amount in order to cause the turning response to be enhanced. There is a long-awaited desire for a vehicle control device, a vehicle, and a vehicle control method that can more satisfactorily control a vehicle.

The present invention has the object of solving the aforementioned problem.

A first aspect of the present invention is characterized by a vehicle control device configured to control a vehicle including a left driving motor configured to drive a left driving wheel, and a right driving motor configured to drive a right driving wheel, the vehicle being configured to turn based on a difference between a vehicle wheel speed of the left driving wheel and a vehicle wheel speed of the right driving wheel, the vehicle control device comprising a target value setting unit configured to set a target vehicle speed and a target yaw rate, an understeering determination unit configured to determine whether or not the vehicle is in an understeering state, based on a deviation between a yaw rate corresponding to the target yaw rate and an actual yaw rate of the vehicle, a correction value calculation unit configured to calculate, in a case it is determined that the vehicle is in the understeering state, a correction value for causing the target vehicle speed to be corrected and lowered, the correction value being calculated based on the deviation, a target vehicle wheel speed setting unit configured to set a target vehicle wheel speed of the left driving wheel and a target vehicle wheel speed of the right driving wheel based on the target vehicle speed, the target yaw rate, and the correction value, and a rotational speed control unit configured to control a rotational speed of the left driving motor based on the target vehicle wheel speed of the left driving wheel, and control a rotational speed of the right driving motor based on the target vehicle wheel speed of the right driving wheel.

A second aspect of the present invention is characterized by a vehicle comprising the vehicle control device according to the first aspect, and configured to turn based on a difference between the vehicle wheel speed of the left driving wheel and the vehicle wheel speed of the right driving wheel.

A third aspect of the present invention is characterized by a vehicle control method of controlling a vehicle including a left driving motor configured to drive a left driving wheel, and a right driving motor configured to drive a right driving wheel, the vehicle being configured to turn based on a difference between a vehicle wheel speed of the left driving wheel and a vehicle wheel speed of the right driving wheel, the vehicle control method comprising a target value setting step of setting a target vehicle speed and a target yaw rate, an understeering determination step of determining whether or not the vehicle is in an understeering state, based on a deviation between a yaw rate corresponding to the target yaw rate and an actual yaw rate of the vehicle, a correction value calculation step of calculating, in a case it is determined that the vehicle is in the understeering state, a correction value for causing the target vehicle speed to be corrected and lowered, the correction value being calculated based on the deviation, a target vehicle wheel speed setting step of setting a target vehicle wheel speed of the left driving wheel and a target vehicle wheel speed of the right driving wheel based on the target vehicle speed, the target yaw rate, and the correction value, and a rotational speed controlling step of controlling a rotational speed of the left driving motor based on the target vehicle wheel speed of the left driving wheel, and controlling a rotational speed of the right driving motor based on the target vehicle wheel speed of the right driving wheel.

According to the present invention, the vehicle control device, the vehicle, and the vehicle control method, which are capable of more satisfactorily controlling the vehicle, can be provided.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

In the technique disclosed in JP 2019-106786 A, the motors are controlled based on the additive control amount obtained by adding the additional control amount to the speed control amount in order to cause the turning response to be enhanced. However, in the case there is a slippage of the driving wheels caused by a delay in the turning response of the electrically powered working vehicle, a problem arises in that, by adding the additional control amount to the speed control amount, slippage of the driving wheels is promoted, and the turning radius of the electrically powered working vehicle increases. As a result of extensive investigation, the inventors of the present application have devised the vehicle control device as described below.

First Embodiment

A description will be presented below concerning a vehicle control device 26, a vehicle 10 equipped with the vehicle control device 26, and a vehicle control method according to a present embodiment.

[Configuration of Vehicle]

Figure 1:
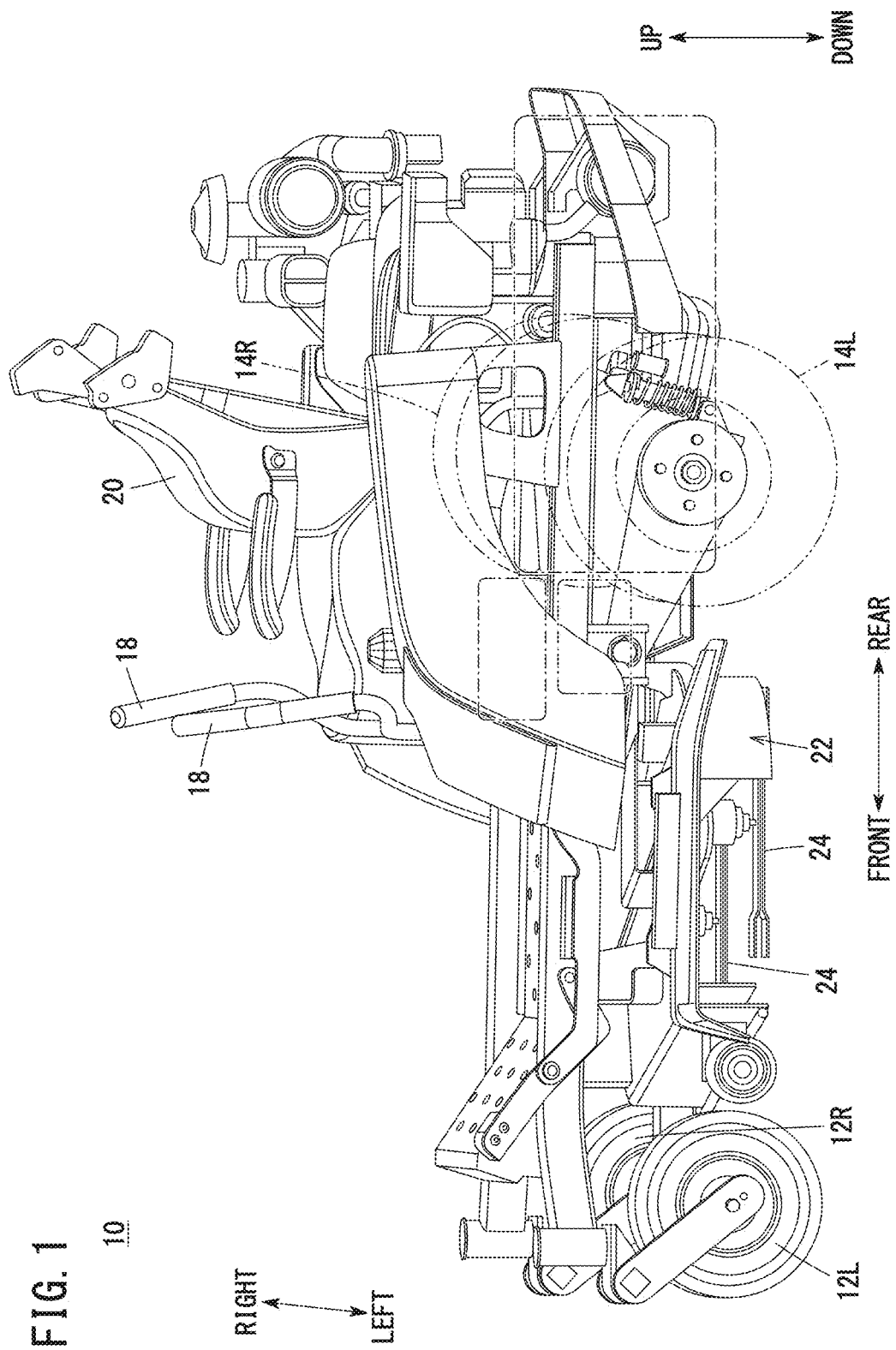
FIG. 1 is a perspective view of a vehicle.

FIG. 1 is a perspective view of the vehicle 10. The vehicle 10 is an electrically powered riding lawn mower. The vehicle 10 is equipped with a left front wheel 12L, a right front wheel 12R, a left driving wheel 14L as a left rear wheel, and a right driving wheel 14R as a right rear wheel. The left front wheel 12L and the right front wheel 12R are caster wheels, and the direction thereof can be freely changed. The left driving wheel 14L is driven by a left driving motor 16L (see FIG. 2), and the right driving wheel 14R is driven by a right driving motor 16R (see FIG. 2). The vehicle 10 does not include a steering wheel, and is capable of turning by means of a difference between a vehicle wheel speed $V_{rl}$ of the left driving wheel 14L and a vehicle wheel speed $V_{rr}$ of the right driving wheel 14R.

The vehicle 10 is equipped with a pair of left and right operating levers 18, and a seat 20. A non-illustrated occupant (an operator) sits on the seat 20, and operates the operating levers 18. By the operating levers 18 being operated, the vehicle 10 moves forward, moves rearward, and turns. The vehicle 10 may also be an automated driving vehicle.

The vehicle 10 is equipped with a lawn mower deck 22. A plurality of blades 24 are provided on the lawn mower deck 22. By the blades 24 being rotated, mowing of the grass is carried out.

[Configuration of Vehicle Control Device]

Figure 2:
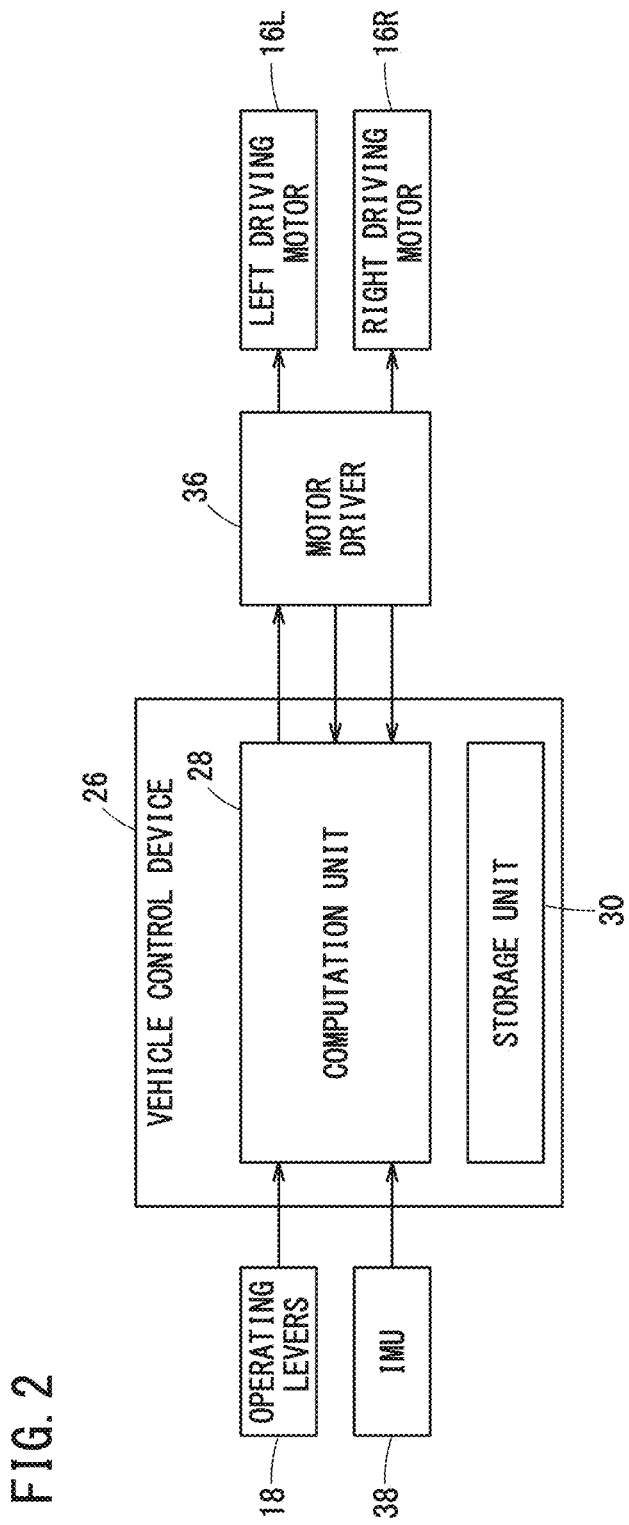
FIG. 2 is a block diagram of a vehicle control device.

FIG. 2 is a block diagram of the vehicle control device 26. The vehicle control device 26 is mounted on the vehicle 10, and controls the vehicle 10. The vehicle control device 26 includes a computation unit 28 and a storage unit 30.

Figure 3:
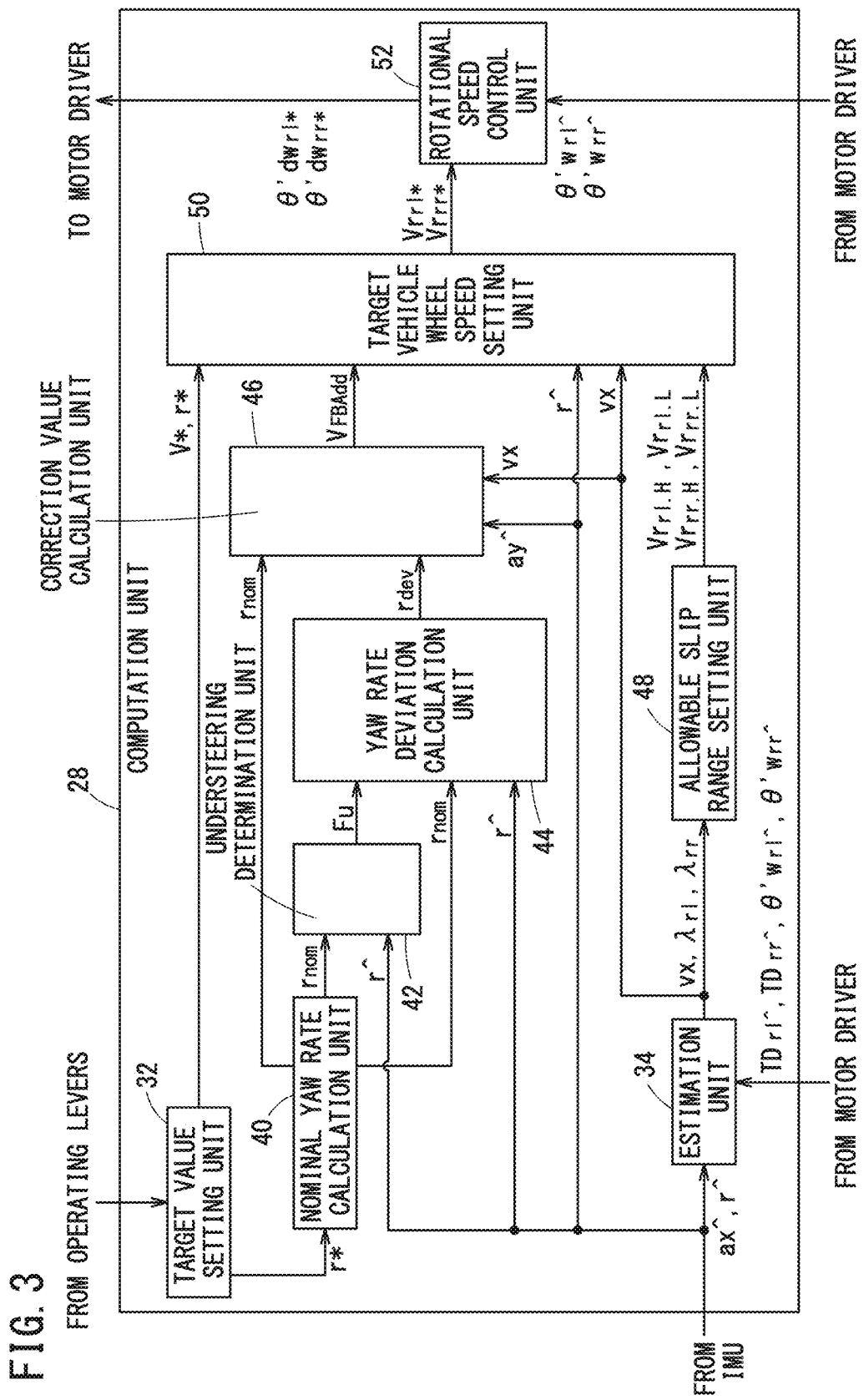
FIG. 3 is a block diagram of a computation unit.

FIG. 3 is a block diagram of the computation unit 28. The computation unit 28 is a processor such as a CPU (Central Processing Unit), a GPU (Graphics Processing Unit), or the like. The computation unit 28 includes a target value setting unit 32, an estimation unit 34, a nominal yaw rate calculation unit 40, an understeering determination unit 42, a yaw rate deviation calculation unit 44, a correction value calculation unit 46, an allowable slip range setting unit 48, a target vehicle wheel speed setting unit 50, and a rotational speed control unit 52. The target value setting unit 32, the estimation unit 34, the nominal yaw rate calculation unit 40, the understeering determination unit 42, the yaw rate deviation calculation unit 44, the correction value calculation unit 46, the allowable slip range setting unit 48, the target vehicle wheel speed setting unit 50, and the rotational speed control unit 52 are realized by executing, in the computation unit 28, a program that is stored in the storage unit 30. At least a portion of the target value setting unit 32, the estimation unit 34, the nominal yaw rate calculation unit 40, the understeering determination unit 42, the yaw rate deviation calculation unit 44, the correction value calculation unit 46, the allowable slip range setting unit 48, the target vehicle wheel speed setting unit 50, and the rotational speed control unit 52 may be realized by an integrated circuit such as an ASIC (Application Specific Integrated Circuit) or an FPGA (Field-Programmable Gate Array) or the like. At least a portion of the target value setting unit 32, the estimation unit 34, the nominal yaw rate calculation unit 40, the understeering determination unit 42, the yaw rate deviation calculation unit 44, the correction value calculation unit 46, the allowable slip range setting unit 48, the target vehicle wheel speed setting unit 50, and the rotational speed control unit 52 may be realized by an electronic circuit including a discrete device.

The storage unit 30 is constituted from a non-illustrated volatile memory and a non-illustrated non-volatile memory, which are computer-readable storage media. The volatile memory, for example, is a RAM (Random Access Memory) or the like. The non-volatile memory, for example, is a ROM (Read Only Memory), a flash memory, or the like. Data and the like are stored, for example, in the volatile memory. Programs, tables, maps, and the like are stored, for example, in the non-volatile memory. At least a portion of the storage unit 30 may be provided in the processor, the integrated circuit, or the like, which were described above. At least a portion of the storage unit 30 may be mounted on a device that is connected to the vehicle 10 by a network.

The target value setting unit 32 sets a target vehicle speed V* and a target yaw rate r* based on an operated amount of the operating levers 18.

The estimation unit 34 estimates a vehicle body speed vx of the vehicle 10. The vehicle body speed vx is estimated based on a driving torque $TD_{rl}\hat{}$ of the left driving wheel 14L, a driving torque $TD_{rr}\hat{}$ of the right driving wheel 14R, a rotational speed $\theta'w_{rl}\hat{}$ of the left driving wheel 14L, a rotational speed $\theta'w_{rr}\hat{}$ of the right driving wheel 14R, a frontward/rearward acceleration $ax\hat{}$ of the vehicle 10, and a yaw rate $\hat{r}$ of the vehicle 10. Hereinafter, the yaw rate $\hat{r}$ of the vehicle 10 may be referred to as an actual yaw rate $\hat{r}$.

The driving torque $\hat{TD_{rl}}$ of the left driving wheel 14L, the driving torque $\hat{TD_{rr}}$ of the right driving wheel 14R, a rotational speed $\hat{\theta'w_{rl}}$ of the left driving wheel 14L, and a rotational speed $\hat{\theta'w_{rr}}$ of the right driving wheel 14R are detected in a motor driver 36.

In the vehicle 10 according to the present embodiment, the left driving wheel 14L and the left driving motor 16L are directly connected, and the rotational speed of the left driving motor 16L is the same as the rotational speed of the left driving wheel 14L. In the case that a transmission is disposed between the left driving wheel 14L and the left driving motor 16L, then based on a gear ratio of the transmission, the rotational speed of the left driving motor 16L can be converted into the rotational speed of the left driving wheel 14L.

Similarly, in the vehicle 10 according to the present embodiment, the right driving wheel 14R and the right driving motor 16R are directly connected, and the rotational speed of the right driving motor 16R is the same as the rotational speed of the right driving wheel 14R. In the case that a transmission is disposed between the right driving wheel 14R and the right driving motor 16R, then based on a gear ratio of the transmission, the rotational speed of the right driving motor 16R can be converted into the rotational speed of the right driving wheel 14R.

The frontward/rearward acceleration $\hat{ax}$ and the actual yaw rate $\hat{r}$ are detected by an inertial measurement unit (hereinafter referred to as IMU) 38. In addition thereto, the IMU 38 also detects a lateral acceleration $\hat{ay}$, an upper/lower acceleration $\hat{az}$, a roll rate $\hat{p}$, and a pitch rate $\hat{q}$ of the vehicle 10.

Hereinafter, a value in which the symbol "^" is included indicates a detected value, or alternatively, a value that is determined from the detected value and a specification value of the vehicle 10. Hereinafter, the detected values may be referred to as observed values or observed quantities. A description will be given in detail later concerning a method of estimating the vehicle body speed vx in the estimation unit 34.

The nominal yaw rate calculation unit 40 calculates a nominal yaw rate $r_{nom}$ corresponding to the target yaw rate $r^*$. The nominal yaw rate $r_{nom}$ is an estimated value of the yaw rate of the vehicle 10 in the case that the left driving motor 16L and the right driving motor 16R are controlled based on the target vehicle speed $V^*$ and the target yaw rate $r^*$ while the vehicle 10 is traveling on a dry asphalt road surface. A description will be given in detail later concerning the calculation of the nominal yaw rate $r_{nom}$.

The understeering determination unit 42 determines whether or not the vehicle 10 is in an understeering state based on the nominal yaw rate $r_{nom}$ and the actual yaw rate $\hat{r}$. Specifically, in the case that the absolute value of the nominal yaw rate $r_{nom}$ is larger than the absolute value of the actual yaw rate $\hat{r}$, and further, the sign of the nominal yaw rate $r_{nom}$ and the sign of the actual yaw rate $\hat{r}$ are the same, the understeering determination unit 42 determines that the vehicle 10 is in the understeering state. On the other hand, in the case that the absolute value of the nominal yaw rate $r_{nom}$ is less than or equal to the absolute value of the actual yaw rate $\hat{r}$, or the sign of the nominal yaw rate $r_{nom}$ and the sign of the actual yaw rate $\hat{r}$ are different, the understeering determination unit 42 determines that the vehicle 10 is not in the understeering state.

In the case it is determined that the vehicle 10 is in the understeering state, the understeering determination unit 42 outputs an understeering determination flag Fu of 1. In the case it is determined that the vehicle 10 is not in the understeering state, the understeering determination unit 42 outputs an understeering determination flag Fu of 0.

The yaw rate deviation calculation unit 44 calculates a yaw rate deviation $r_{dev}$ which is a deviation between the nominal yaw rate $r_{nom}$ and the actual yaw rate $\hat{r}$. A description will be given in detail later concerning the calculation of the yaw rate deviation $r_{dev}$.

The correction value calculation unit 46 calculates a correction value $V_{FBAdd}$ for correcting the target vehicle speed $V^*$. In the case that the vehicle 10 is in the understeering state, a lateral force of the left driving wheel 14L and a lateral force of the right driving wheel 14R are insufficient with respect to the centrifugal force that acts on the vehicle 10. Therefore, by reducing the vehicle speed of the vehicle 10, the centrifugal force that acts on the vehicle 10 is made smaller. Consequently, the insufficiency in the lateral force of the left driving wheel 14L and the lateral force of the right driving wheel 14R with respect to the centrifugal force that acts on the vehicle 10 is eliminated, and an expansion of the turning radius of the vehicle 10 is suppressed. A description will be given in detail later concerning the calculation of the correction value $V_{FBAdd}$.

The allowable slip range setting unit 48 sets a left slip determination upper limit value $Vr_{rl.H}$ and a left slip determination lower limit value $Vr_{rl.L}$ for determining the slip of the left driving wheel 14L. The allowable slip range of the left driving wheel 14L is set by the left slip determination upper limit value $Vr_{rl.H}$ and the left slip determination lower limit value $Vr_{rl.L}$.

The allowable slip range setting unit 48 sets a right slip determination upper limit value $Vr_{rr.H}$ and a right slip determination lower limit value $Vr_{rr.L}$ for determining the slip of the right driving wheel 14R. The allowable slip range of the right driving wheel 14R is set by the right slip determination upper limit value $Vr_{rr.H}$ and the right slip determination lower limit value $Vr_{rr.L}$. A description will be given in detail later concerning the setting of the allowable slip range.

The target vehicle wheel speed setting unit 50 determines a left and right vehicle wheel speed distribution that satisfies the target vehicle speed $V^*$ and the target yaw rate $r^*$ insofar as possible within the allowable slip range. In accordance with this feature, a target vehicle wheel speed $Vr_{rl}^*$ and a target vehicle wheel speed $Vr_{rr}^*$ are set within the allowable slip range. Therefore, slippage of the left driving wheel 14L and the right driving wheel 14R can be suppressed. A description will be given in detail later concerning the setting of the target vehicle wheel speed $Vr_{rl}^*$ and the target vehicle wheel speed $Vr_{rr}^*$.

The rotational speed control unit 52 controls the rotational speed of the left driving motor 16L. The rotational speed control unit 52 sets a rotational speed command value $\theta'dw_{rl}^*$ based on the target vehicle wheel speed $Vr_{rl}^*$ and the rotational speed $\hat{\theta'w_{rl}}$ of the left driving wheel 14L, and outputs the rotational speed command value $\theta'dw_{rl}^*$ to the motor driver 36. The motor driver 36 drives the left driving motor 16L in accordance with the rotational speed command value $\theta'dw_{rl}^*$.

The rotational speed control unit 52 controls the rotational speed of the right driving motor 16R. The rotational speed control unit 52 sets a rotational speed command value $\theta'dW_{rr}^*$ based on the target vehicle wheel speed $Vr_{rr}^*$ and the rotational speed $\hat{\theta'w_{rr}}$ of the right driving wheel 14R, and outputs the rotational speed command value $\theta'dw_{rr}^*$ to the motor driver 36. The motor driver 36 drives the right driving motor 16R in accordance with the rotational speed command value θ'dw$_{rr}$*.

[Concerning Calculation of Nominal Yaw Rate]

Figure 4:
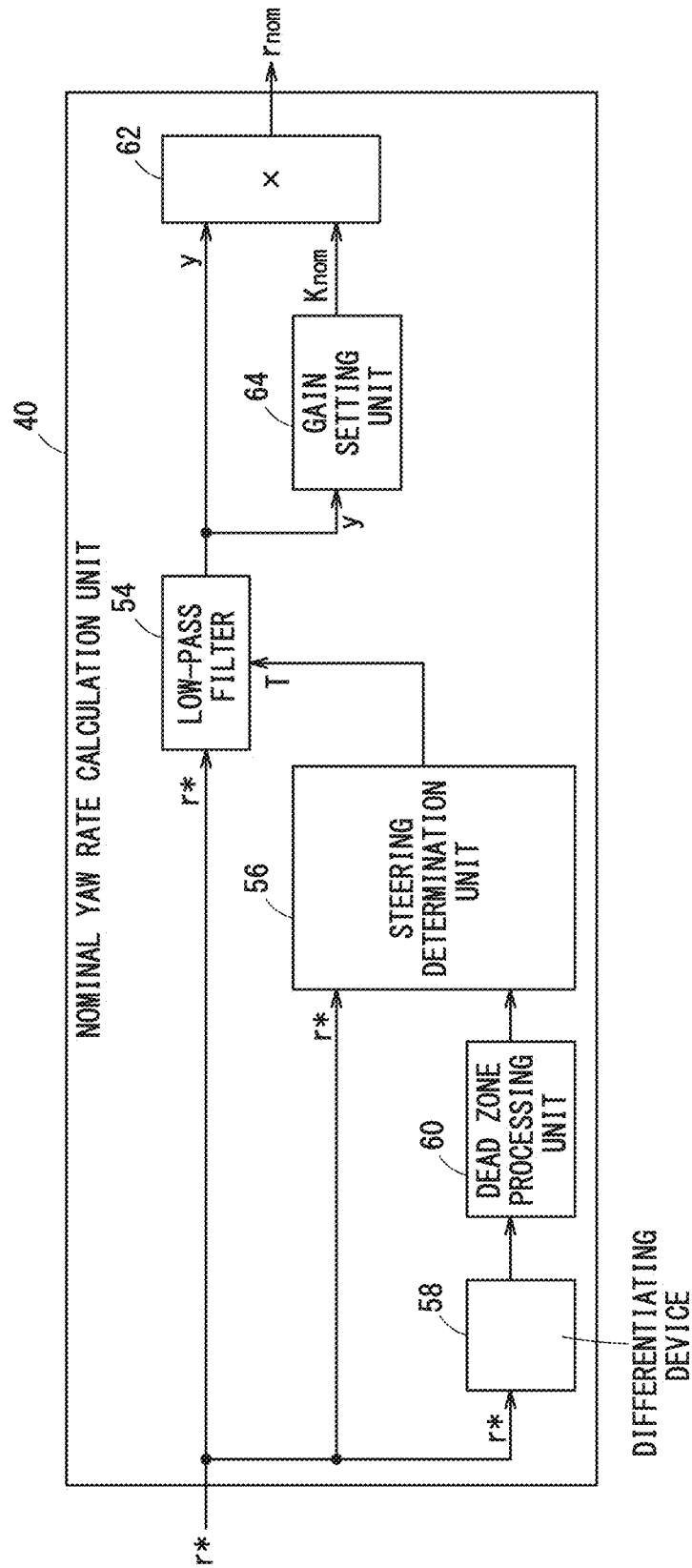
FIG. 4 is a block diagram of a nominal yaw rate calculation unit.

FIG. 4 is a block diagram of the nominal yaw rate calculation unit 40. The nominal yaw rate calculation unit 40 includes a low-pass filter 54, a steering determination unit 56, a differentiating device 58, a dead zone processing unit 60, a multiplying device 62, and a gain setting unit 64.

As noted previously, the nominal yaw rate r$_{nom}$ is an estimated value of the yaw rate of the vehicle 10 in the case that the left driving motor 16L and the right driving motor 16R are controlled based on the target vehicle speed V* and the target yaw rate r* while the vehicle 10 is traveling on a dry asphalt road surface. The nominal yaw rate r$_{nom}$ is determined taking into consideration the response delay of the left driving motor 16L and the right driving motor 16R, and the limit of the lateral force of the left driving wheel 14L and the lateral force of the right driving wheel 14R.

The low-pass filter 54 reproduces the response delay of the left driving motor 16L and the right driving motor 16R. A yaw rate y obtained after the target yaw rate r* is processed by the low-pass filter 54 can be determined by the following Equation (1).

$$y[t] = \frac{2T - Ts}{2T + Ts} r_{nom}[t-1] + \frac{Ts}{2T + Ts} \{r*[t] - r*[t-1]\} \quad (1)$$

"T" in Equation (1) indicates a time constant, and the time constant T is determined by the steering determination unit 56, which will be described later. "Ts" in Equation (1) is a sampling time. In Equation (1), "t" indicates a step number, where [t] indicates a current value, and [t−1] indicates a previous value.

The loads that act on the left driving motor 16L and the right driving motor 16R while the magnitude of the actual yaw rate is in the process of decreasing become smaller than the loads that act on the left driving motor 16L and the right driving motor 16R while the magnitude of the actual yaw rate is in the process of increasing. Therefore, the responsiveness of the left driving motor 16L and the right driving motor 16R while the magnitude of the actual yaw rate is in the process of decreasing becomes higher than the responsiveness of the left driving motor 16L and the right driving motor 16R while the magnitude of the actual yaw rate is in the process of increasing. The magnitude of the actual yaw rate can also be expressed as an absolute value of the actual yaw rate.

The difference in the responsiveness can be reproduced by making the time constant T of the low-pass filter 54 different. The steering determination unit 56 sets the time constant T while the magnitude of the actual yaw rate is in the process of decreasing to be smaller than the time constant T while the magnitude of the actual yaw rate is in the process of increasing.

While the magnitude of the actual yaw rate is in the process of increasing, the sign of the target yaw rate r*, and the sign of the differential value of the target yaw rate r* become the same. On the other hand, while the magnitude of the actual yaw rate is in the process of decreasing, the sign of the target yaw rate r*, and the sign of the differential value of the target yaw rate r* become different.

The differentiating device 58 differentiates the target yaw rate r*. In the case that the differential value of the target yaw rate r* is extremely small, the dead zone processing unit 60 outputs the differential value of the target yaw rate r* as 0 (zero). In the case that the sign of the target yaw rate r*, and the sign of the differential value of the target yaw rate r* are the same, the steering determination unit 56 determines that the magnitude of the actual yaw rate is in the process of increasing. In the case that the sign of the target yaw rate r*, and the sign of the differential value of the target yaw rate r* are different, the steering determination unit 56 determines that the magnitude of the actual yaw rate is in the process of decreasing. The steering determination unit 56 sets the time constant T while the magnitude of the actual yaw rate is in the process of decreasing to be smaller than the time constant T while the magnitude of the actual yaw rate is in the process of increasing.

In the multiplying device 62, by multiplying the yaw rate y by a gain K$_{nom}$, the limit of the lateral force of the left driving wheel 14L and the lateral force of the right driving wheel 14R is reproduced. The gain setting unit 64 reads out the gain K$_{nom}$ corresponding to the yaw rate y from a map in which the gain K$_{nom}$ that is associated with the yaw rate y is stored, and sets the gain K$_{nom}$.

[Concerning Calculation of Yaw Rate Deviation]

Figure 5:
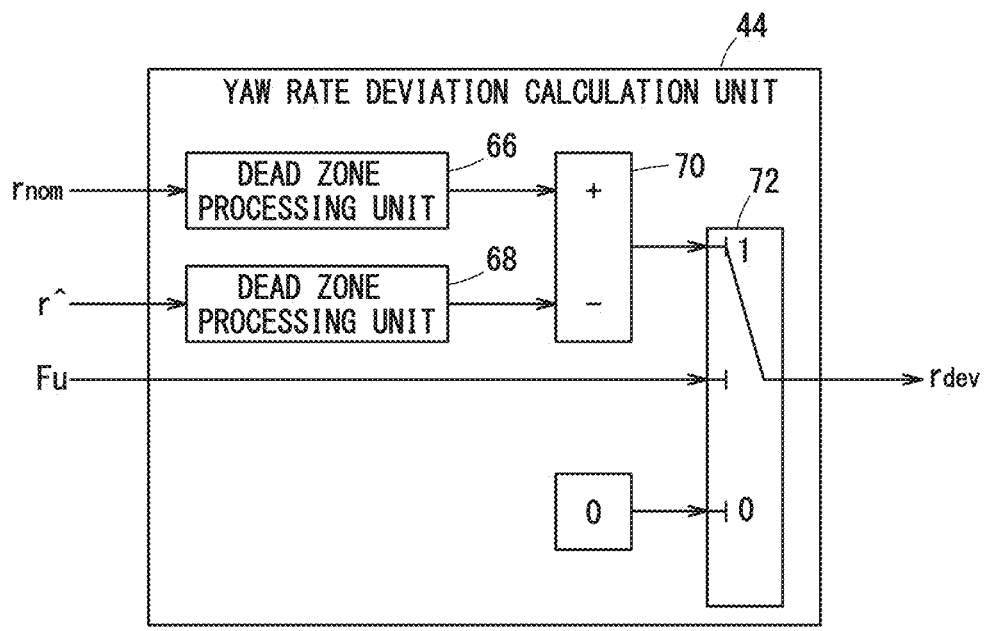
FIG. 5 is a block diagram of a yaw rate deviation calculation unit.

FIG. 5 is a block diagram of the yaw rate deviation calculation unit 44. The yaw rate deviation calculation unit 44 includes a dead zone processing unit 66, a dead zone processing unit 68, an addition/subtraction unit 70, and a deviation selection unit 72.

In the case that the nominal yaw rate r$_{nom}$ is extremely small, the dead zone processing unit 66 outputs the nominal yaw rate r$_{nom}$ as 0 (zero). In the case that the actual yaw rate r^ is extremely small, the dead zone processing unit 68 outputs the actual yaw rate r^ as 0 (zero). The addition/subtraction unit 70 calculates the difference between the nominal yaw rate r$_{nom}$ and the actual yaw rate r^.

In the case that the aforementioned understeering determination flag Fu is 1, the deviation selection unit 72 outputs, as the yaw rate deviation rev, the difference between the nominal yaw rate r$_{nom}$ and the actual yaw rate r^ as calculated in the addition/subtraction unit 70. In the case that the understeering determination flag Fu is 0, the deviation selection unit 72 outputs 0 (zero) as the yaw rate deviation r$_{dev}$.

[Concerning Calculation of Correction Value]

Figure 6:
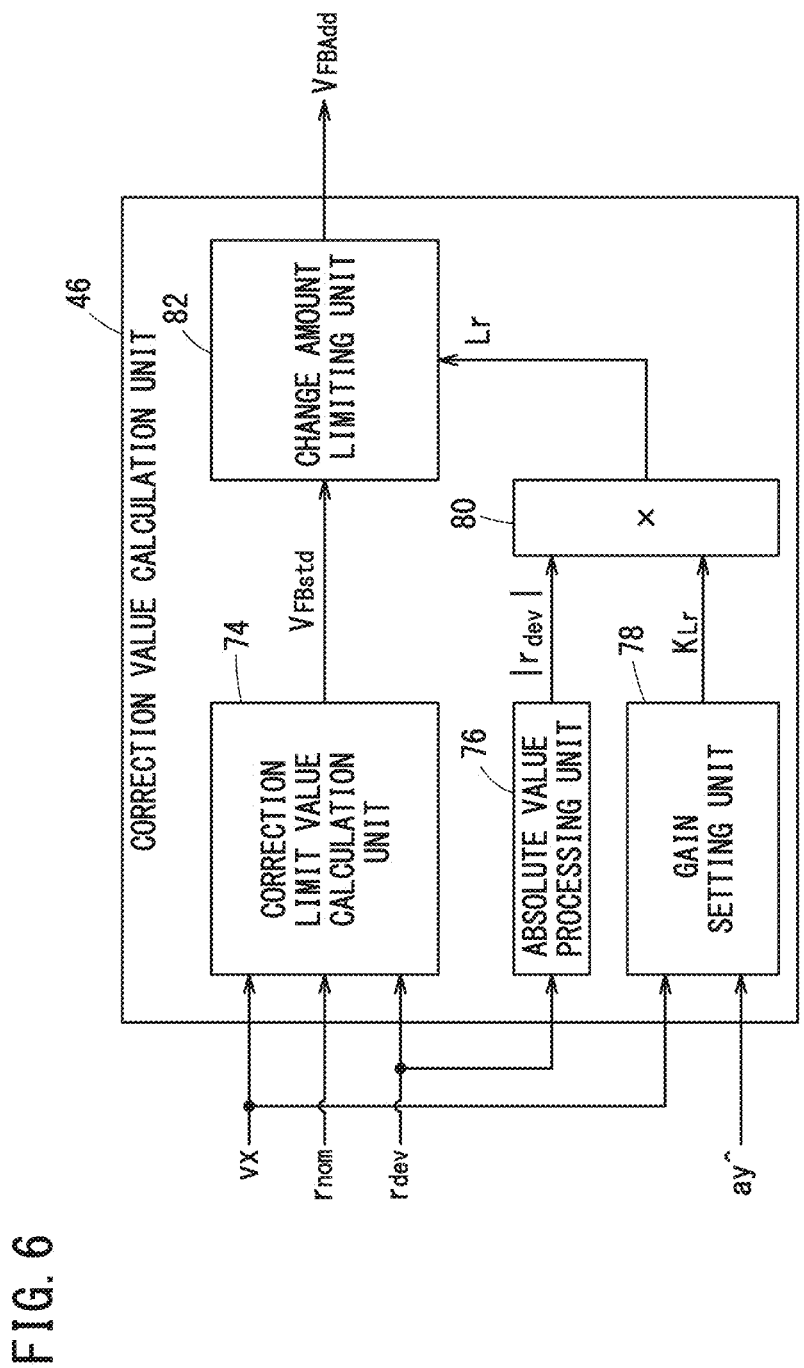
FIG. 6 is a block diagram of a correction value calculation unit.

FIG. 6 is a block diagram of the correction value calculation unit 46. The correction value calculation unit 46 includes a correction limit value calculation unit 74, an absolute value processing unit 76, a gain setting unit 78, a multiplying device 80, and a change amount limiting unit 82.

The correction limit value calculation unit 74 calculates a correction limit value V$_{FBStd}$. The correction limit value V$_{FBStd}$ can be determined by the following Equation (2).

$$V_{FBStd} = -\left| r_{dev} \frac{vx}{r_{nom}} \right| \quad (2)$$

As the ratio of the actual yaw rate r^ to the nominal yaw rate r$_{nom}$ becomes smaller, the absolute value of the correction limit value V$_{FBStd}$ is set to a larger value. Further, as the vehicle body speed vx becomes larger, the absolute value of the correction limit value V$_{FBStd}$ is set to a larger value. Consequently, as the ratio of the actual yaw rate r^ to the nominal yaw rate r$_{nom}$ becomes smaller, or alternatively, as the vehicle body speed vx becomes larger, the target vehicle speed V* is corrected to a smaller degree. Therefore, an expansion of the turning radius of the vehicle 10 can be suppressed, and the yaw rate deviation $r_{dev}$ can be brought closer to 0 (zero).

In the understeering determination unit 42, in the case it is determined that the vehicle 10 is not in the understeering state, the yaw rate deviation calculation unit 44 outputs 0 (zero) as the yaw rate deviation $r_{dev}$. Therefore, the correction limit value $V_{FBStd}$ becomes 0 (zero).

Even if the correction limit value $V_{FBStd}$ is not set, in the case that the vehicle 10 is in the understeering state, the yaw rate deviation $r_{dev}$ can be brought closer to 0 (zero) by reducing the vehicle speed. However, in that case, despite the yaw rate deviation $r_{dev}$ being small, the vehicle 10 will continue to decelerate, and there is a concern that the vehicle 10 will eventually come to a halt. The correction limit value $V_{FBStd}$ is a target value for the amount by which the target vehicle speed V* should be corrected, and together therewith, is a limit value for the purpose of suppressing an excessive decrease in the target vehicle speed V*.

In the case that the target vehicle speed V* is corrected using the correction limit value $V_{FBStd}$, there is a concern that the vehicle 10 may suddenly decelerate, and lead to a deterioration in the operability of the vehicle 10, as well as a deterioration in the riding comfort of the vehicle 10. Thus, in the correction value calculation unit 46, the amount of change in the correction value $V_{FBAdd}$ is limited, and an abrupt change in the target vehicle speed V* is suppressed.

The absolute value processing unit 76 determines the absolute value of the yaw rate deviation $r_{dev}$. The gain setting unit 78 reads out a gain $K_{Lr}$ corresponding to the vehicle body speed vx and the lateral acceleration ay^ from a map in which the gain $K_{Lr}$ that is associated with the vehicle body speed vx and the lateral acceleration ay^ is stored, and sets the gain $K_{Lr}$. The gain $K_{Lr}$ is set to a larger value as the vehicle body speed vx becomes larger, or alternatively, as the lateral acceleration ay^ becomes larger. The multiplying device 80 calculates, as a rate limit value Lr, a value obtained by multiplying the absolute value of the yaw rate deviation $r_{dev}$ by the gain $K_{Lr}$.

The larger the vehicle body speed vx is, or alternatively, the larger the lateral acceleration ay^ is, the larger the centrifugal force becomes. In the case that the centrifugal force is large, the restriction imposed by the rate limit value Lr is relaxed, and priority is given to suppressing an expansion of the turning radius of the vehicle 10, while sacrificing to some degree the operability of the vehicle 10 and the riding comfort of the vehicle 10.

The change amount limiting unit 82 limits the amount of change in the correction limit value $V_{FBStd}$. The change amount limiting unit 82 limits the magnitude of the amount of change in the correction limit value $V_{FBStd}$ to be less than or equal to the rate limit value Lr, and outputs such a limited value as the correction value $V_{FBAdd}$. The magnitude of the amount of change in the correction limit value $V_{FBStd}$ can also be expressed as an absolute value of the amount of change in the correction limit value $V_{FBStd}$.

Figure 7:
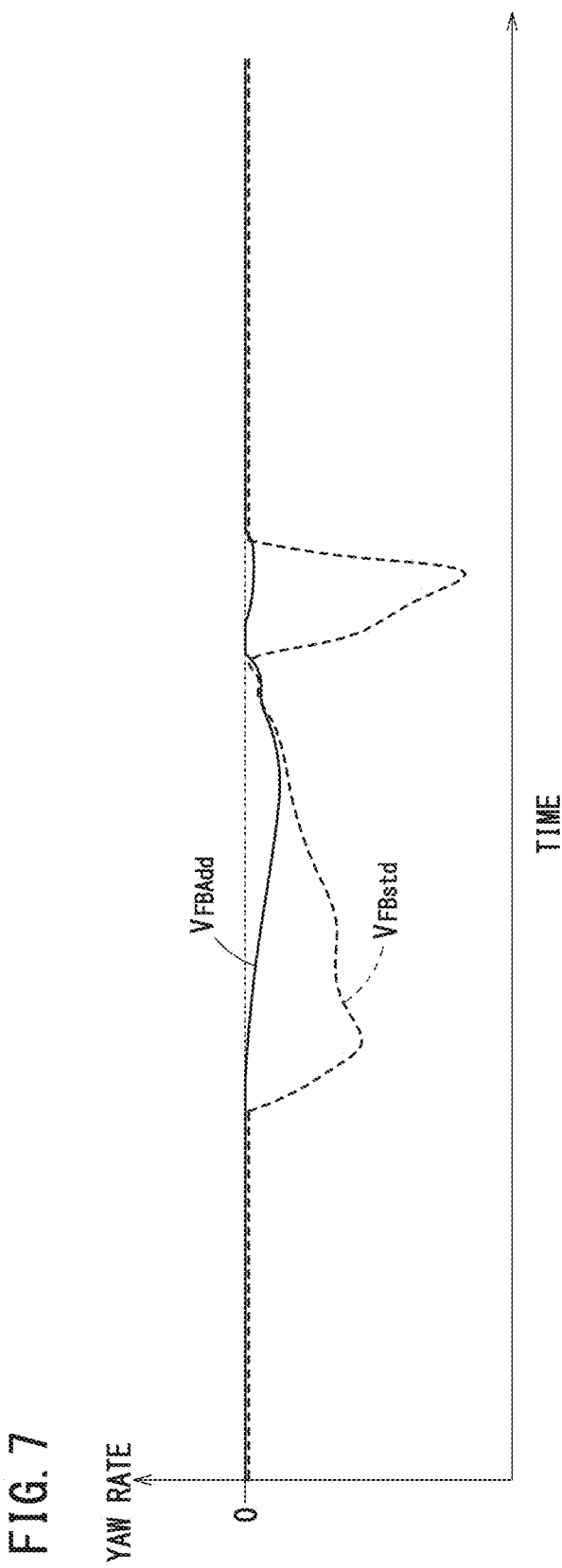
FIG. 7 is a graph showing a change over time of a correction limit value and a correction value.

FIG. 7 is a graph showing a change over time of the correction limit value $V_{FBStd}$ and the correction value $V_{FBAdd}$. As shown in the graph of FIG. 7, the change in the correction value $V_{FBAdd}$ is suppressed in comparison with the change in the correction limit value $V_{FBStd}$.

[Concerning Setting of Allowable Slip Range]

Figure 8:
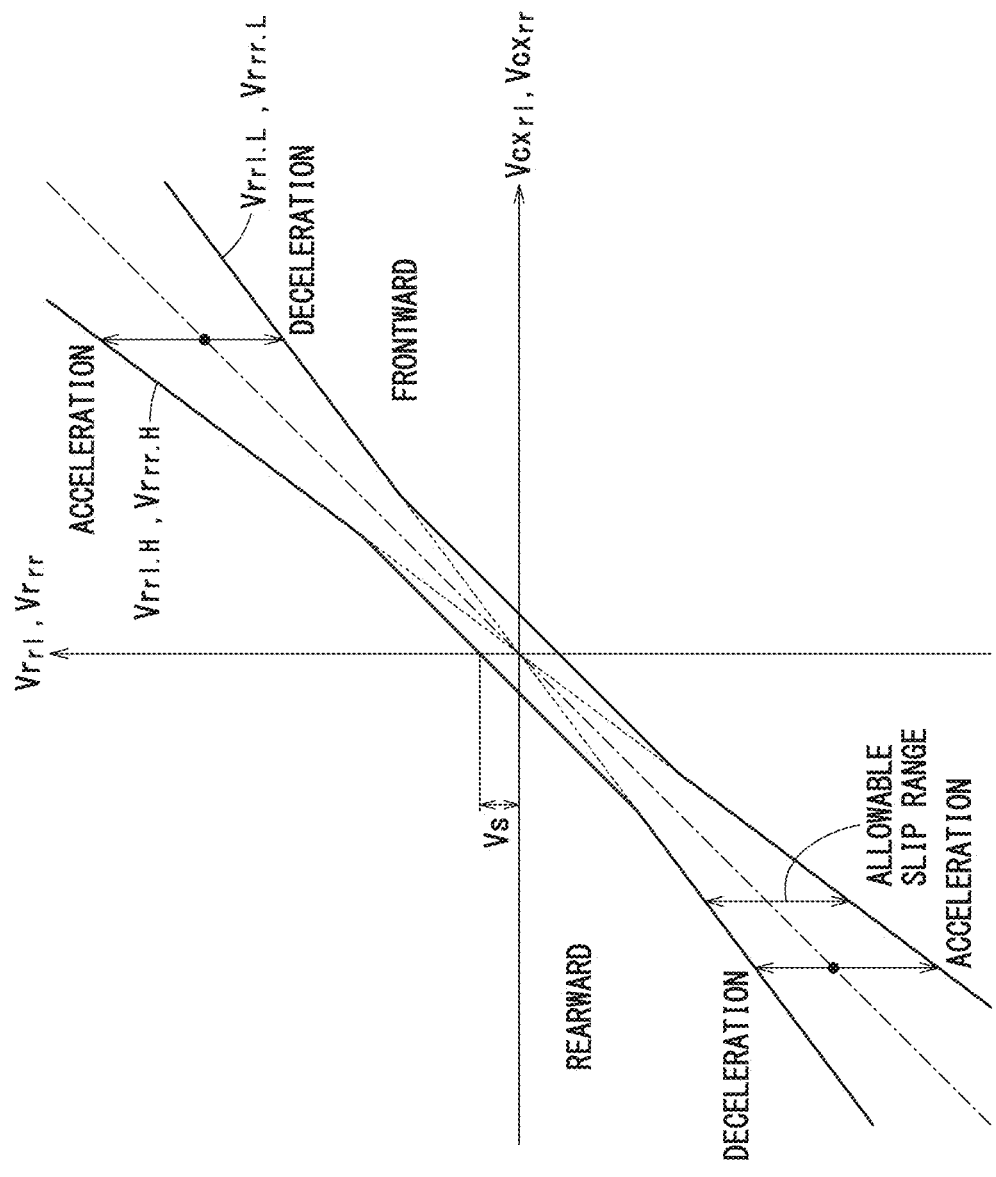
FIG. 8 is a graph showing an allowable slip range.

A description will be given below concerning the setting of the allowable slip range. FIG. 8 is a graph showing the allowable slip range. The left slip determination upper limit value $Vr_{rl.H}$, the left slip determination lower limit value $Vr_{rl.L}$, the right slip determination upper limit value $Vr_{rr.H}$, and the right slip determination lower limit value $Vr_{rr.L}$ can be determined by the following Equation (3).

$$\begin{bmatrix} Vr_{rl \cdot H} \\ Vr_{rl \cdot L} \\ Vr_{rr \cdot R} \\ Vr_{rr \cdot L} \end{bmatrix} = \begin{bmatrix} Vcx_{rl} + \max(\kappa s_{fwd} \cdot |Vcx_{rl}|, Vs) \\ Vcx_{rl} + \min(\kappa s_{rvs} \cdot |Vcx_{rl}|, -Vs) \\ Vcx_{rr} + \max(\kappa s_{fwd} \cdot |Vcx_{rr}|, Vs) \\ Vcx_{rr} + \min(\kappa s_{rvs} \cdot |Vcx_{rr}|, -Vs) \end{bmatrix} \quad (3)$$

$$Vcx_{rl} = vx - \frac{dr}{2}r^\wedge \quad (4)$$

$$Vcx_{rr} = vx + \frac{dr}{2}r^\wedge \quad (5)$$

$$\kappa s_{fwd} = \min(\lambda_{rl}, \lambda_{rr}) \times \kappa s_{fwd \cdot 0} \quad (6)$$

$$\kappa s_{rvs} = \min(\lambda_{rl}, \lambda_{rr}) \times \kappa s_{rvs \cdot 0} \quad (7)$$

In Equation (3), "$Vcx_{rl}$" is a ground speed of the left driving wheel 14L, and "$Vcx_{rr}$" is a ground speed of the right driving wheel 14R. The ground speed $Vcx_{rl}$ can also be expressed as an axial speed of the left driving wheel 14L. Similarly, the ground speed $Vcx_{rr}$ can also be expressed as an axial speed of the right driving wheel 14R. As shown in Equation (4), the ground speed $Vcx_{rl}$ is calculated from the vehicle body speed vx and the actual yaw rate r^. As shown in Equation (5), the ground speed $Vcx_{rr}$ is calculated from the vehicle body speed vx and the actual yaw rate r^. In Equation (4) and Equation (5), "dr" is a tread width between the left driving wheel 14L and the right driving wheel 14R.

In Equation (3), "$\kappa s_{fwd}$" is a determined slip ratio in the forward traveling direction, and is a value that is greater than or equal to 0 (zero). In Equation (3), "$\kappa s_{rvs}$" is a determined slip ratio in the rearward traveling direction, and is a value that is less than 0 (zero). The determined slip ratio $\kappa s_{fwd}$ is determined from Equation (6). The determined slip ratio $\kappa s_{rvs}$ is determined from Equation (7).

"Vs" in Equation (3) is a minimum slip speed and is a value that is greater than 0 (zero). The minimum slip speed Vs is used in order to define a slip determination value at an extremely low speed.

In Equation (6) and Equation (7), "$\lambda_{rl}$" is a road surface coefficient (a left road surface coefficient), which is an estimated value of a correction coefficient with respect to a reference friction coefficient of the left driving wheel 14L. In Equation (6) and Equation (7), "$\lambda_{rr}$" is a road surface coefficient (a right road surface coefficient), which is an estimated value of a correction coefficient with respect to a reference friction coefficient of the right driving wheel 14R.

In Equation (6), "$\kappa S_{fwd.o}$" is a determined slip ratio in the forward traveling direction at a time when the road surface coefficient $\lambda_{rl}$ and the road surface coefficient $\lambda_{rr}$ are 1, and is a value that is greater than or equal to 0 (zero). In Equation (7), "$\kappa S_{rvs.o}$" is a determined slip ratio in the rearward traveling direction at a time when the road surface coefficient $\lambda_{rl}$ and the road surface coefficient $\lambda_{rr}$ are 1, and is a value that is less than 0 (zero).

[Concerning Setting of Target Vehicle Wheel Speeds]

A description will be given below concerning the setting of the target vehicle wheel speed $Vr_{rl}$* of the left driving wheel 14L and the target vehicle wheel speed $Vr_{rr}$* of the right driving wheel 14R. The target vehicle wheel speed setting unit 50 sets a target operating point based on an operating point defined by the current vehicle body speed vx and the actual yaw rate r^, and an operating point defined by the target vehicle speed V*, the target yaw rate r*, and the correction value $V_{FBAdd}$. The target vehicle wheel speed setting unit 50 sets the target vehicle wheel speed $Vr_{rl}^*$ and the target vehicle wheel speed $Vr_{rr}^*$ based on the target operating point.

Figure 9:
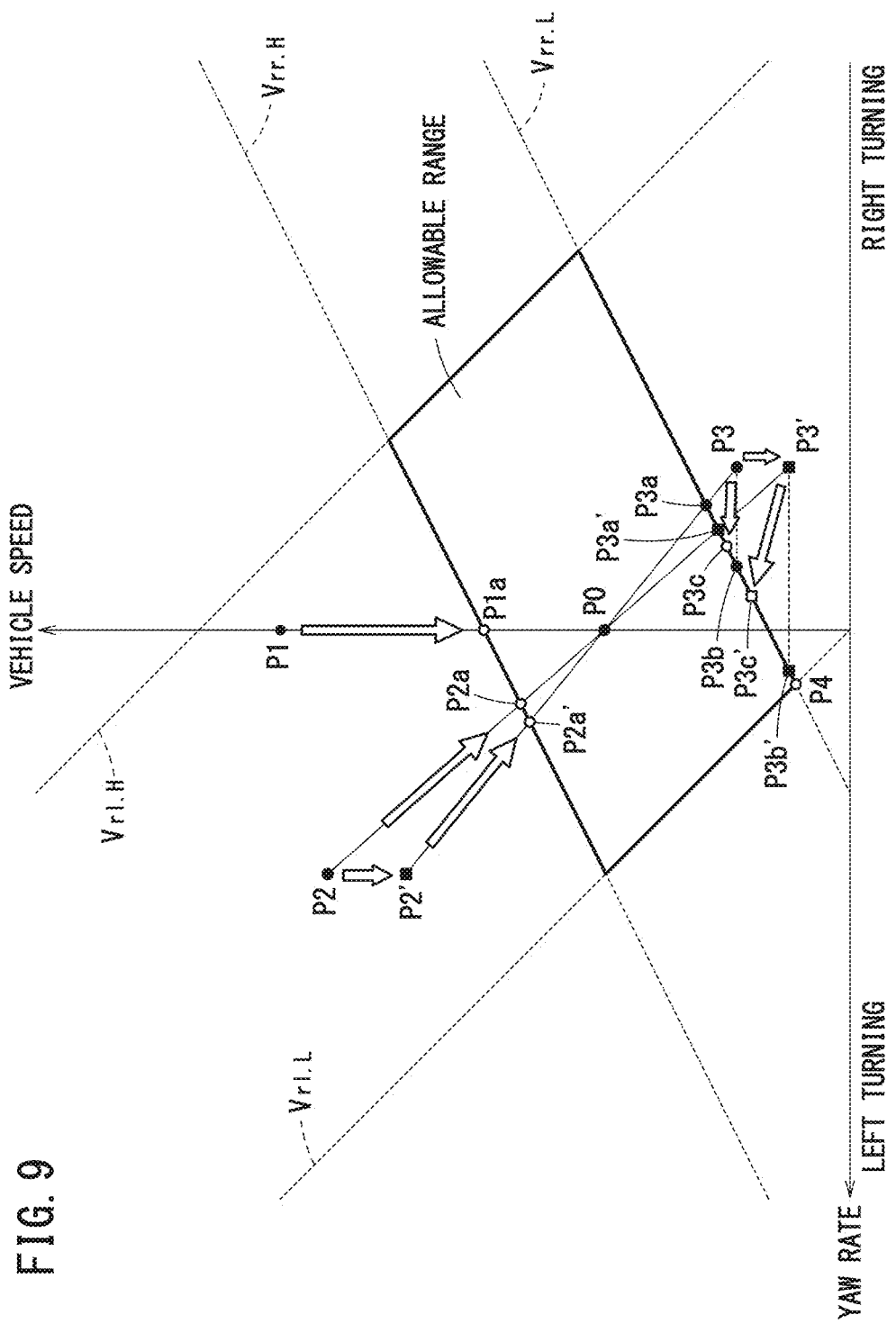
FIG. 9 is a diagram for describing a method of setting a target operating point.

FIG. 9 is a diagram for describing a method of setting the target operating point. "$V_{rl\cdot H}$" in FIG. 9 is a value obtained converting the left slip determination upper limit value $Vr_{rl\cdot H}$ into the vehicle speed, and hereinafter will be referred to as a left vehicle wheel speed upper limit value $V_{rl\cdot H}$. "$V_{rl\cdot L}$" in FIG. 9 is a value obtained by converting the left slip determination lower limit value $Vr_{rl\cdot L}$ into the vehicle speed, and hereinafter will be referred to as a left vehicle wheel speed lower limit value $V_{rl\cdot L}$. "$V_{rr\cdot H}$" in FIG. 9 is a value obtained by converting the right slip determination upper limit value $Vr_{rr\cdot H}$ into the vehicle speed, and hereinafter will be referred to as a right vehicle wheel speed upper limit value $V_{rr\cdot H}$. "$V_{rr\cdot L}$" in FIG. 9 is a value obtained by converting the right slip determination lower limit value $Vr_{rr\cdot L}$ into the vehicle speed, and hereinafter will be referred to as a right vehicle wheel speed lower limit value $V_{rr\cdot L}$.

The left vehicle wheel speed upper limit value $V_{rl\cdot H}$, the left vehicle wheel speed lower limit value $V_{rl\cdot L}$, the right vehicle wheel speed upper limit value $V_{rr\cdot H}$, and the right vehicle wheel speed lower limit value $V_{rr\cdot L}$ are calculated by the following Equation (8).

$$\begin{bmatrix} V_{rl\cdot H} \\ V_{rl\cdot L} \\ V_{rr\cdot H} \\ V_{rr\cdot L} \end{bmatrix} = \begin{bmatrix} Vr_{rl\cdot H} + \dfrac{dr}{2}r^{\wedge} \\ Vr_{rl\cdot L} + \dfrac{dr}{2}r^{\wedge} \\ Vr_{rr\cdot H} - \dfrac{dr}{2}r^{\wedge} \\ Vr_{rr\cdot L} - \dfrac{dr}{2}r^{\wedge} \end{bmatrix} \quad (8)$$

The target vehicle wheel speed setting unit 50 sets the target operating point within an allowable range surrounded by the left vehicle wheel speed upper limit value $V_{rl\cdot H}$, the left vehicle wheel speed lower limit value $V_{rl\cdot L}$, the right vehicle wheel speed upper limit value $V_{rr\cdot H}$, and the right vehicle wheel speed lower limit value $V_{rr\cdot L}$. By setting the target vehicle wheel speed $Vr_{rl}^*$ of the left driving wheel 14L based on the target operating point that is set within the allowable range, the target vehicle wheel speed $Vr_{rl}^*$ is set within the allowable slip range of the left driving wheel 14L. By setting the target vehicle wheel speed $Vr_{rr}^*$ of the right driving wheel 14R based on the target operating point that is set within the allowable range, the target vehicle wheel speed $Vr_{rr}^*$ is set within the allowable slip range of the right driving wheel 14R.

The operating point defined by the current vehicle body speed vx and the actual yaw rate $r^{\wedge}$ is taken to be a point P0. As methods for setting the target operating point, hereinafter, five examples thereof are indicated.

The first example is an exemplary case in which the vehicle 10 accelerates while traveling straight forward. The operating point, which is defined by the target vehicle speed V* and the target yaw rate r*, is taken to be a point P1. In this case, the target vehicle wheel speed setting unit 50 sets a point P1a as the target operating point. The target operating point P1a is the point that is closest to the point P1 within the allowable range from among the points located on a line connecting the points P0 and P1.

The second example is an exemplary case in which, for a case in which the vehicle 10 accelerates while turning, it is determined that the vehicle 10 is not in the understeering state. The operating point, which is defined by the target vehicle speed V* and the target yaw rate r*, is taken to be a point P2. In this case, the target vehicle wheel speed setting unit 50 sets a point P2a as the target operating point. The target operating point P2a is the point that is closest to the point P2 within the allowable range from among the points located on a line connecting the points P0 and P2.

The third example is an exemplary case in which, for a case in which the vehicle 10 accelerates while turning, it is determined that the vehicle 10 is in the understeering state. The operating point, which is defined by the target vehicle speed V*, the target yaw rate r*, and the correction value $V_{FBAdd}$, is taken to be a point P2'. In this case, the target vehicle wheel speed setting unit 50 sets a point P2a' as the target operating point. The target operating point P2a' is the point that is closest to the point P2' within the allowable range from among the points located on a line connecting the points P0 and P2'.

Although the vehicle speed at the target operating point P2a' is lower than the vehicle speed at the target operating point P2a, the magnitude of the yaw rate at the target operating point P2a' is larger than the magnitude of the yaw rate at the target operating point P2a. More specifically, in the case it is determined that the vehicle 10 is in the understeering state, the vehicle speed is made slower in comparison with the case in which it is determined that the vehicle 10 is not in the understeering state, and thereby an expansion of the turning radius of the vehicle 10 is suppressed.

The fourth example is an exemplary case in which, for a case in which the vehicle 10 decelerates while turning, it is determined that the vehicle 10 is not in the understeering state. The operating point, which is defined by the target vehicle speed V* and the target yaw rate r*, is taken to be a point P3. In this case, the target vehicle wheel speed setting unit 50 sets a point P3c as the target operating point. The target operating point P3c is any one of the points on a line connecting a point P3a and a point P3b. The point P3a is the point that is closest to the point P3 within the allowable range from among the points located on a line connecting the points P0 and P3. The point P3b is the point that is closest to the point P3 within the allowable range from among the points that coincide with the target vehicle speed V*.

Figure 10:
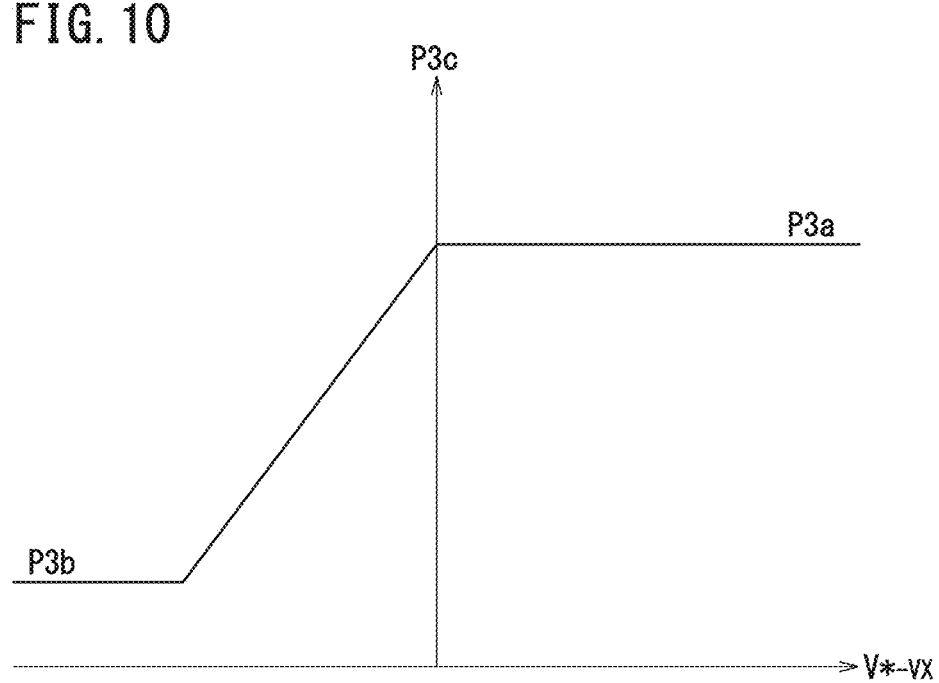
FIG. 10 is an image diagram of the method of setting the target operating point.

FIG. 10 is an image diagram of the method of setting the target operating point P3c. As shown in FIG. 10, when a vehicle speed deviation (=V*−vx) is negative, the target operating point P3c is set to a point that is closer to the point P3b as the magnitude of the vehicle speed deviation increases. Further, when the vehicle speed deviation is negative, the target operating point P3c is set to a point that is closer to the point P3a as the magnitude of the vehicle speed deviation decreases. The magnitude of the vehicle speed deviation can also be expressed as an absolute value of the vehicle speed deviation.

The fifth example is an exemplary case in which, for a case in which the vehicle 10 decelerates while turning, it is determined that the vehicle 10 is in the understeering state. The operating point, which is defined by the target vehicle speed V*, the target yaw rate r*, and the correction value $V_{FBAdd}$, is taken to be a point P3'. In this case, the target vehicle wheel speed setting unit 50 sets a point P3c' as the target operating point. The target operating point P3c' is any one of the points on a line connecting a point P3a' and a point P3b'. The method of setting the point P3a' is the same as the method of setting the point P3a described above. The method of setting the point P3b' is the same as the method of setting the point P3b described above. The method of setting the target operating point P3c' is the same as the method of setting the target operating point P3c described above.

Although the vehicle speed at the target operating point P3c' is lower than the vehicle speed at the target operating point P3c, the magnitude of the yaw rate at the target operating point P3c' is larger than the magnitude of the yaw rate at the target operating point P3c. More specifically, in the case it is determined that the vehicle 10 is in the understeering state, the vehicle speed is made slower in comparison with the case in which it is determined that the vehicle 10 is not in the understeering state, and thereby an expansion of the turning radius of the vehicle 10 is suppressed.

In the case that the target vehicle speed V* is smaller than the allowable range, then irrespective of the target yaw rate r*, a point P4 is set as the target operating point. In the case that the vehicle 10 is caused to decelerate, a target operating point is set that prioritizes the target vehicle speed V* over the target yaw rate r*. Therefore, the target operating point is set to a point within the allowable range that is as close as possible to the target vehicle speed V*. Consequently, although there is a possibility that the vehicle 10 may turn in a direction that is opposite to the target yaw rate r*, the vehicle 10 can be reliably made to decelerate. In addition, since the vehicle 10 decelerates, the vehicle 10 can be easily made to turn.

In the case that the operating point defined by the target vehicle speed V* and the target yaw rate r* lies within the allowable range, the operating point is set as the target operating point. In this case, the target vehicle wheel speed $Vr_{rl}*$ of the left driving wheel 14L is calculated by the following Equation (9). The target vehicle wheel speed $Vr_{rr}*$ of the right driving wheel 14R is calculated by the following Equation (10).

$$Vr_{rl}* = V* - \frac{dr}{2}r* \quad (9)$$

$$Vr_{rr}* = V* + \frac{dr}{2}r* \quad (10)$$

In the case that the operating point defined by the target vehicle speed V* and the target yaw rate r* lies outside of the allowable range, the target vehicle wheel speed $Vr_{rl}*$ and the target vehicle wheel speed $Vr_{rr}*$ are calculated from the vehicle speed and the yaw rate corresponding to the set target operating point, in a manner similar to that shown in Equation (9) and Equation (10).

[Concerning Estimation of Vehicle Body Speed]

The estimation unit 34 processes a first state equation and an observation equation using a first extended Kalman filter (a first parameter estimation method), and thereby estimates the vehicle body speed vx (a vehicle body speed estimated value), the road surface coefficient $\lambda_{rl}$ (a left road surface coefficient estimated value) of the left driving wheel 14L, and the road surface coefficient $\lambda_{rr}$ (a right road surface coefficient estimated value) of the right driving wheel 14R. The first state equation includes, as state quantities, an estimated value vx of the vehicle body speed, an estimated value $\lambda_{rl}$ of the road surface coefficient of the left driving wheel 14L, and an estimated value $\lambda_{rr}$ of the road surface coefficient of the right driving wheel 14R. The observation equation includes, as observed quantities, an observed value $\theta'w_{rl}{}^\wedge$ of the rotational speed of the left driving wheel 14L, an observed value $\theta'w_{rr}{}^\wedge$ of the rotational speed of the right driving wheel 14R, an observed value $ax^\wedge$ of the frontward/rearward acceleration of the vehicle 10, and an observed value $r^\wedge$ of the actual yaw rate.

The first state equation and the observation equation are set based on a dynamic model of the vehicle 10, a dynamic model of the left driving wheel 14L, and a dynamic model of the right driving wheel 14R. The following Equation (11) is the first state equation, and the following Equation (12) is the observation equation.

$$\frac{d}{dt}\begin{bmatrix} \theta' w_{rl} \\ \theta' w_{rr} \\ vx \\ r \\ \lambda_{rl} \\ \lambda_{rr} \end{bmatrix} = \begin{bmatrix} -\frac{Re \cdot Fx_{rl}}{Iw} \\ -\frac{Re \cdot Fx_{rr}}{Iw} \\ \frac{1}{M}(Fx_{rl} + Fx_{rr}) \\ \frac{d_r}{2 \cdot Iz}(Fx_{rl} - Fx_{rr}) \\ k\mu(1 - \lambda_{rl}) \\ k\mu(1 - \lambda_{rr}) \end{bmatrix} + \begin{bmatrix} \frac{TD_{rl}}{Iw} \\ \frac{TD_{rr}}{Iw} \\ g\sin\phi P - \mu r \cdot g \cos\phi P \\ 0 \\ 0 \\ 0 \end{bmatrix} \quad (11)$$

$$\begin{bmatrix} Vr_{rl}{}^\wedge \\ Vr_{rr}{}^\wedge \\ a_x{}^\wedge \\ r^\wedge \\ vx^\wedge \\ \lambda_{rl}{}^\wedge \\ \lambda_{rr}{}^\wedge \end{bmatrix} = \begin{bmatrix} Re \cdot \theta' w_{rl} \\ Re \cdot \theta' w_{rr} \\ \frac{1}{M}(Fx_{rl} + Fx_{rr} - \mu r \cdot M \cdot g \cos\phi P) \\ r \\ vx \\ \lambda_{rl} \\ \lambda_{rr} \end{bmatrix} \quad (12)$$

$$Fx_{rl} = \frac{Fz_{rl}}{Fz0_{rl}}\lambda_{rl} \cdot Px2 \cdot \tanh\left(\frac{\kappa T0 \cdot \Phi 0}{2Re \cdot \lambda_{rl} \cdot Px2}\right)\kappa_{rl} \quad (13)$$

$$Fx_{rr} = \frac{Fz_{rr}}{Fz0_{rr}}\lambda_{rr} \cdot Px2 \cdot \tanh\left(\frac{\kappa T0 \cdot \Phi 0}{2Re \cdot \lambda_{rr} \cdot Px2}\right)\kappa_{rr} \quad (14)$$

$$Fz_{rl} = Fz0_{rl} \cdot \cos\phi R \cdot \cos\phi P - \frac{h}{2dr}M \cdot ay^\wedge + \frac{h}{2l}M \cdot ax^\wedge \quad (15)$$

$$Fz_{rr} = Fz0_{rr} \cdot \cos\phi R \cdot \cos\phi P + \frac{h}{2dr}M \cdot ay^\wedge + \frac{h}{2l}M \cdot ax^\wedge \quad (16)$$

$$\kappa_{rl} = \frac{Vr_{rl}{}^\wedge - Vcx_{rl}}{|Vcx_{rl}|} \quad (17)$$

$$\kappa_{rr} = \frac{Vr_{rr}{}^\wedge - Vcx_{rr}}{|Vcx_{rr}|} \quad (18)$$

$$Vr_{rl}{}^\wedge = Re \cdot \theta' w_{rl}{}^\wedge \quad (19)$$

$$Vr_{rr}{}^\wedge = Re \cdot \theta' w_{rr}{}^\wedge \quad (20)$$

$$Vcx_{rl} = vx - \frac{dr}{2}r^\wedge \quad (4)$$

$$Vcx_{rr} = vx + \frac{dr}{2}r^\wedge \quad (5)$$

In the first state equation and the observation equation, there are used, as the state quantities, the rotational speed $\theta'w_{rl}$ of the left driving wheel 14L, the rotational speed $\theta'w_{rr}$ of the right driving wheel 14R, the vehicle body speed vx, the yaw rate r, the road surface coefficient $\lambda_{rl}$ between the left driving wheel 14L and a ground contact road surface, and the road surface coefficient $\lambda_{rr}$ between the right driving wheel 14R and a ground contact road surface. Further, as control inputs, there are used the driving torque $TD_{rl}$ of the left driving wheel 14L, the driving torque $TD_{rr}$ of the right driving wheel 14R, and a pitch angle $\phi P$ of the vehicle 10. Further, as the observed quantities, there are used a vehicle wheel speed $Vr_{rl}{}^\wedge$ of the left driving wheel 14L, a vehicle wheel speed $Vr_{rr}{}^\wedge$ of the right driving wheel 14R, the frontward/rearward acceleration $ax^\wedge$ of the vehicle 10, the actual yaw rate $r^\wedge$ of the vehicle 10, the vehicle body speed $vx^\wedge$, the road surface coefficient $\lambda_{rl}{}^\wedge$ between the left driving wheel 14L and the ground contact road surface, and the road surface coefficient $\lambda_{rr}{}^{\wedge}$ between the right driving wheel 14R and the ground contact road surface.

Among the observed quantities, the vehicle body speed vx^, the road surface coefficient $\lambda_{rl}{}^{\wedge}$, and the road surface coefficient $\lambda_{rr}{}^{\wedge}$ are pseudo-observed values. For example, in the case that the estimated values are forced to be arbitrary values, then such arbitrary values are input to the pseudo-observed values. In accordance with this feature, the estimated values are prevented from diverging.

"$Fx_{rl}$" in Equation (11) and Equation (12) is a driving force in the frontward/rearward direction of the left driving wheel 14L, and "$Fx_{rr}$" is a driving force in a frontward/rearward direction of the right driving wheel 14R. The driving force $Fx_{rl}$ is determined using Equation (13), and the driving force $Fx_{rr}$ is determined using Equation (14).

"$Fz_{rl}$" in Equation (13) is a wheel load of the left driving wheel 14L, and "$Fz_{rr}$" in Equation (14) is a wheel load of the right driving wheel 14R. The wheel load $Fz_{rl}$ is determined using Equation (15), and the wheel load $Fz_{rr}$ is determined using Equation (16).

In Equation (13), "$\kappa_{rl}$" is a slip ratio of the left driving wheel 14L, and "$\kappa_{rr}$" in Equation (14) is a slip ratio of the right driving wheel 14R. The slip ratio $\kappa_{rl}$ is determined using Equation (17), and the slip ratio $\kappa_{rr}$ is determined using the Equation (18).

"$Vr_{rl}{}^{\wedge}$" in Equation (17) is a vehicle wheel speed of the left driving wheel 14L, and "$Vr_{rr}{}^{\wedge}$" in Equation (18) is a vehicle wheel speed of the right driving wheel 14R. As shown in Equation (19), the vehicle wheel speed $Vr_{rl}{}^{\wedge}$ is determined from a radius Re of the left driving wheel 14L and the rotational speed $\theta' w_{rl}{}^{\wedge}$ of the left driving wheel 14L. As shown in Equation (20), the vehicle wheel speed $Vr_{rr}{}^{\wedge}$ is determined from a radius Re of the right driving wheel 14R, and the rotational speed $\theta' w_{rr}{}^{\wedge}$ of the right driving wheel 14R.

"Iw" in Equation (11) is a moment of inertia of the left driving wheel 14L and the right driving wheel 14R, and is a specification value. "Iz" in equation (11) is a yaw moment of inertia, and is a specification value.

"M" in Equation (11), Equation (12), Equation (15), and Equation (16) is a weight of the vehicle 10, and is a specification value. In Equation (15) and Equation (16), "h" is a height of the center of gravity of the vehicle 10, and is a specification value. "$Fz0_{rl}$" in Equation (13) and Equation (15) is a set wheel load of the left driving wheel 14L, and is a specification value. "$Fz0_{rr}$" in Equation (14) and Equation (16) is a set wheel load of the right driving wheel 14R, and is a specification value.

"Px2" in Equation (13) and Equation (14) is a reference maximum driving force of the left driving wheel 14L and the right driving wheel 14R, and is a specification value. In Equation (13) and Equation (14), "$\kappa T0$" is a reference tire stiffness of the left driving wheel 14L and the right driving wheel 14R, and is a specification value. In Equation (13) and Equation (14), "$\phi 0$" is a reference ground contact length of the left driving wheel 14L and the right driving wheel 14R.

In Equation (15) and Equation (16), "ay^" is a lateral acceleration of the vehicle 10, and is detected by the IMU 38. In Equation (11), "$\kappa\mu$" is a friction recovery coefficient, and is set to an arbitrary value. In Equation (11) and Equation (12), "g" is a gravitational acceleration. In Equation (11), Equation (12), Equation (15), and Equation (16), "$\phi P$" is an estimated value of the pitch angle of the vehicle 10. In Equation (15) and Equation (16), "$\phi R$" is an estimated value of a roll angle of the vehicle 10.

The estimation unit 34 processes a second state equation and an observation relational expression using a second extended Kalman filter (a second parameter estimation method), and thereby estimates the pitch angle $\phi P$ and the roll angle $\phi R$ of the vehicle 10. The second state equation includes, as state quantities, the estimated value $\phi P$ of the pitch angle, and the estimated value $\phi R$ of the roll angle. The observation relational expression shows a relationship between an observed value $\phi P{}^{\wedge}$ of the pitch angle and an observed value $\phi R{}^{\wedge}$ of the roll angle, and the observed value ax^ of the frontward/rearward acceleration, the observed value ay^ of the lateral acceleration, and the observed value az^ of the upper/lower acceleration.

The second state equation and the observation relational expression are set based on the dynamic model of the vehicle 10. The following Equation (21) is the second state equation, and the following Equation (22) is the observation relational expression.

$$\frac{d}{dx}\begin{bmatrix}\phi R \\ \phi P \\ pb \\ qb \\ rb\end{bmatrix} = \begin{bmatrix}(p^{\wedge}-pb) + (q^{\wedge}-qb)\cdot\sin\phi R\cdot\tan\phi P + (r^{\wedge}-rb)\cdot\cos\phi R\cdot\tan\phi P \\ (q^{\wedge}-qb)\cos\phi R - (r^{\wedge}-rb)\sin\phi R \\ 0 \\ 0 \\ 0\end{bmatrix} \quad (21)$$

$$\begin{bmatrix}\phi R^{\wedge} \\ \phi P^{\wedge}\end{bmatrix} = \begin{bmatrix}\tan^{-1}\left(\frac{ay^{\wedge}}{az^{\wedge}}\right) \\ -\tan^{-1}\left(\frac{ax^{\wedge}}{\sqrt{ay^{\wedge 2}+az^{\wedge 2}}}\right)\end{bmatrix} \quad (22)$$

In the second state equation, there are used, as state quantities, the pitch angle $\phi P$ of the vehicle 10 and the roll angle $\phi R$ of the vehicle 10. Further, there are used, as control inputs, a roll rate p, a pitch rate q, and a yaw rate r. In the observation relational expression, there are used, as observed quantities, the pitch angle $\phi P{}^{\wedge}$ of the vehicle 10, the roll angle $\phi R{}^{\wedge}$ of the vehicle 10, the frontward/rearward acceleration ax^ of the vehicle 10, the lateral acceleration ay^ of the vehicle 10, and the upper/lower acceleration az^ of the vehicle 10.

In Equation (21), "pb" is a deviation amount of a midpoint of the roll rate p^ detected by the IMU 38, and is an estimated value. In Equation (21), "qb" is a deviation amount of a midpoint of the pitch rate q^ that is detected by the IMU 38. In Equation (21), "rb" is a deviation amount of a midpoint of the actual yaw rate r^ that is detected by the IMU 38.

The pitch angle $\phi P$ and the roll angle $\phi R$, which make up the angle of inclination of the vehicle 10, can be determined by integrating the angular velocity. However, since a deviation of a midpoint is included in the angular velocity detected by the IMU 38, the angle of inclination that is determined from the angular velocity also includes a deviation of the integrated midpoint.

Further, since the direction of the gravitational acceleration g with respect to the vehicle 10 changes due to the vehicle 10 being inclined, the angle of inclination can also be determined from the acceleration of the vehicle 10. However, the dynamic acceleration of the vehicle 10 is included in the acceleration detected by the IMU 38, and therefore, particularly at a time when the vehicle 10 is accelerating or decelerating, or at a time when the vehicle 10 is turning, a large amount of error is included in the angle of inclination determined from the acceleration.

According to the present embodiment, the second state equation is set using the angular velocity, and the observation relational expression is set using the acceleration. By processing the second state equation and the observation relational expression using the second extended Kalman filter, the deviation of the midpoint of the angular velocity and the dynamic acceleration can be corrected in a complementary manner. More specifically, the second extended Kalman filter can be made to function as a complementary filter.

According to the present embodiment, the estimation is carried out using the extended Kalman filters, however, the estimation may be carried out using other parameter estimation methods. As such other parameter estimation methods, there may also be used a least squares estimation, a Markov estimation, a maximum likelihood estimation, a Bayesian estimation, or the like. Further, although the extended Kalman filters are a type of the Bayesian estimation, other Kalman filters, for example, a sigma point Kalman filter or the like, may also be used.

[Driving Motor Control]

Figure 11:
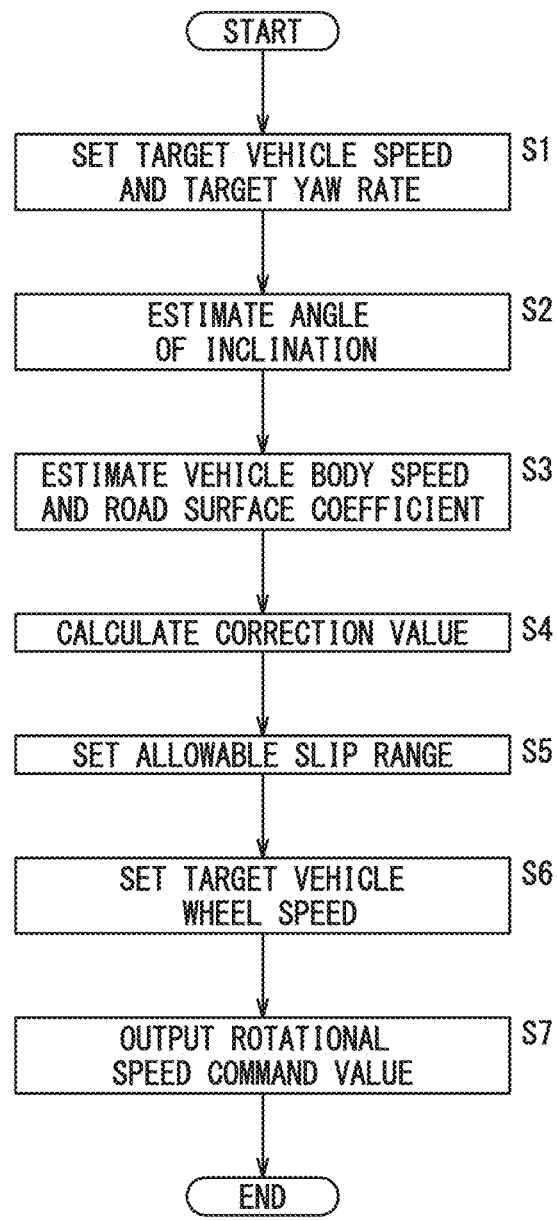
FIG. 11 is a flowchart of a driving motor control performed in the vehicle control device.

FIG. 11 is a flowchart of the driving motor control performed in the vehicle control device 26. The driving motor control is repeatedly executed at a predetermined cycle.

In step S1, the target value setting unit 32 sets the target vehicle speed V* and the target yaw rate r* based on an operated amount of the operating levers 18. Thereafter, the process transitions to step S2.

In step S2, the estimation unit 34 estimates the angle of inclination of the vehicle 10 based on the roll rate $p\hat{}$, the pitch rate $q\hat{}$, the actual yaw rate $r\hat{}$, the frontward/rearward acceleration $ax\hat{}$, the lateral acceleration $ay\hat{}$, and the upper/lower acceleration $az\hat{}$. Thereafter, the process transitions to step S3.

In step S3, the estimation unit 34 estimates the vehicle body speed vx, the road surface coefficient $\lambda_{rl}$, and the road surface coefficient $\lambda_{rr}$ based on the rotational speed $\theta'w_{rl}\hat{}$ and the driving torque $TD_{rl}\hat{}$ of the left driving wheel 14L, the rotational speed $\theta'w_{rr}\hat{}$ and the driving torque $TD_{rr}\hat{}$ of the right driving wheel 14R, the frontward/rearward acceleration $ax\hat{}$, and the actual yaw rate $r\hat{}$. Thereafter, the process transitions to step S4.

In step S4, the correction value calculation unit 46 calculates the correction value $V_{FBAdd}$. Thereafter, the process transitions to step S5.

In step S5, the allowable slip range setting unit 48 calculates the left slip determination upper limit value $Vr_{rl\_H}$ and the left slip determination lower limit value $Vr_{rl\_L}$, and sets the allowable slip range of the left driving wheel 14L. Further, the allowable slip range setting unit 48 calculates the right slip determination upper limit value $Vr_{rr\_H}$ and the right slip determination lower limit value $Vr_{rr\_L}$, and sets the allowable slip range of the right driving wheel 14R. Thereafter, the process transitions to step S6.

In step S6, the target vehicle wheel speed setting unit 50 sets, within the allowable slip range of the left driving wheel 14L, the target vehicle wheel speed $Vr_{rl}$* of the left driving wheel 14L, based on the target vehicle speed V*, the target yaw rate r*, and the correction value $V_{FBAdd}$. Further, the target vehicle wheel speed setting unit 50 sets, within the allowable slip range of the right driving wheel 14R, the target vehicle wheel speed $Vr_{rr}$* of the right driving wheel 14R, based on the target vehicle speed V*, the target yaw rate r*, and the correction value $V_{FBAdd}$. Thereafter, the process transitions to step S7.

In step S7, the rotational speed control unit 52 sets the rotational speed command value $\theta'dw_{rl}$* of the left driving motor 16L and the rotational speed command value $\theta'dw_{rr}$* of the right driving motor 16R, based on the target vehicle wheel speed $Vr_{rl}$* of the left driving wheel 14L, the target vehicle wheel speed $Vr_{rr}$* of the right driving wheel 14R, the rotational speed $\theta'w_{rl}\hat{}$ of the left driving motor 16L, and the rotational speed $\theta'w_{rr}\hat{}$ of the right driving motor 16R. The rotational speed control unit 52 outputs the rotational speed command value $\theta'dw_{rl}$* and the rotational speed command value $\theta'dw_{rr}$* to the motor driver 36. Thereafter, the driving motor control comes to an end.

Second Embodiment

As shown in the aforementioned FIG. 9, in the vehicle control device 26 of the first embodiment, in the case that the operating point (for example, the operating point P1) defined by the target vehicle speed V* and the target yaw rate r* lies outside of the allowable range, the target operating point is set to an operating point (for example, the operating point P1a) that lies within the allowable range. Consequently, the target vehicle wheel speed $Vr_{rl}$* of the left driving wheel 14L and the target vehicle wheel speed $Vr_{rr}$* of the right driving wheel 14R are set within the allowable slip range. More specifically, in the vehicle control device 26 according to the first embodiment, in the case that the target vehicle speed V* and the target yaw rate r* have values that cause the left driving wheel 14L and the right driving wheel 14R to slip, a slip suppression control intervenes, whereby the target vehicle wheel speed $Vr_{rl}$* and the target vehicle wheel speed $Vr_{rr}$* that do not cause the left driving wheel 14L and the right driving wheel 14R to slip are set. Therefore, in the vehicle control device 26 according to the first embodiment, even in the case that both the left driving wheel 14L and the right driving wheel 14R are gripping, the slip suppression control intervenes. As a result, despite the fact that both the left driving wheel 14L and the right driving wheel 14R are gripping, the behavior of the vehicle 10 in accordance with the operations of the operating levers 18 may not be realized, and a feeling of discomfort may be imparted to the occupant.

Figure 12:
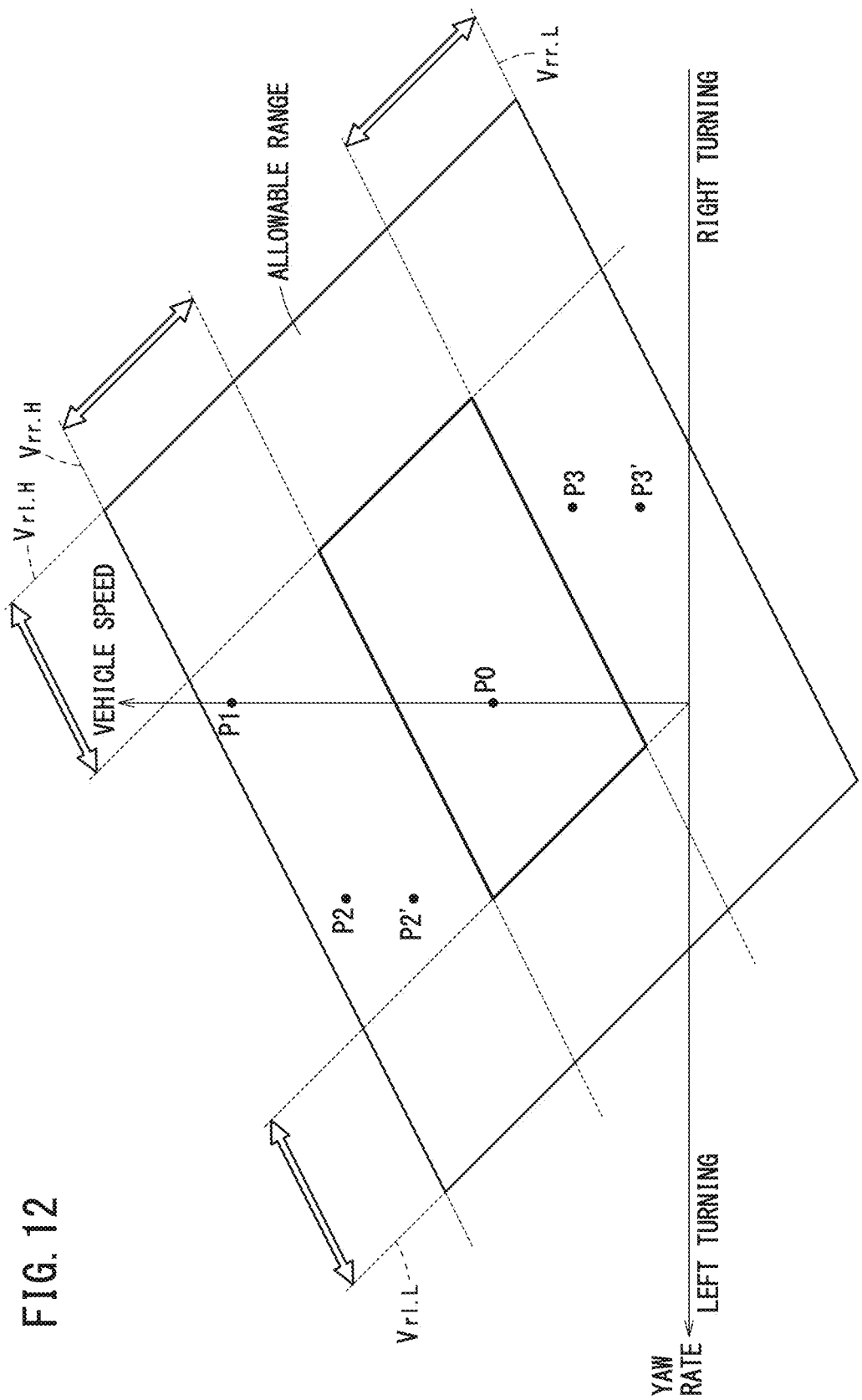
FIG. 12 is an image diagram of an allowable range according to a present embodiment.

In the vehicle control device 26 according to the present embodiment, in the case that both the left driving wheel 14L and the right driving wheel 14R are gripping, the allowable range is changed. In accordance with this feature, it is possible to prevent the slip suppression control from intervening in the case that both the left driving wheel 14L and the right driving wheel 14R are gripping. FIG. 12 is an image diagram of the allowable range according to the present embodiment. In the case that both the left driving wheel 14L and the right driving wheel 14R are gripping, the vehicle control device 26 expands the allowable range, causes the operating points (point P1, point P2, point P2', point P3, and point P3') defined by the target vehicle speed V* and the target yaw rate r* to be positioned within the allowable range, and does not cause the slip suppression control to intervene. On the other hand, in the case that at least one of the left driving wheel 14L or the right driving wheel 14R has slipped, the vehicle control device 26 causes the allowable range to contract, and makes it easier for the slip suppression control to intervene.

[Configuration of Vehicle Control Device]

Figure 13:
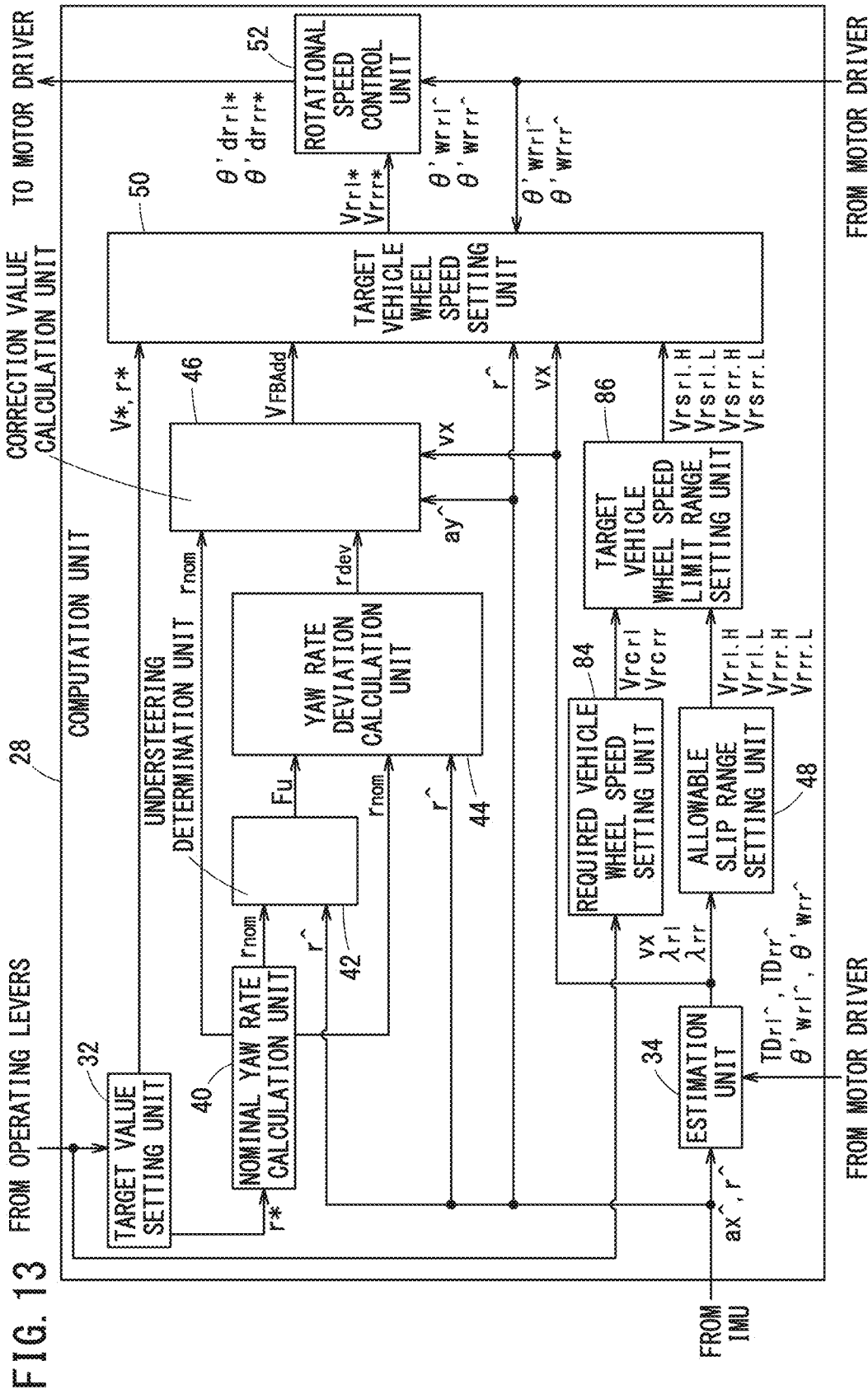
FIG. 13 is a block diagram of the computation unit.

FIG. 13 is a block diagram of the computation unit 28. The computation unit 28 according to the present embodiment, in addition to the configuration of the computation unit 28 of the first embodiment, includes a required vehicle wheel speed setting unit 84 and a target vehicle wheel speed limit range setting unit 86.

The required vehicle wheel speed setting unit 84 sets a required vehicle wheel speed $Vrc_{rl}$ of the left driving wheel 14L and a required vehicle wheel speed $Vrc_{rr}$ of the right driving wheel 14R based on an operated amount of the operating levers 18. The target vehicle wheel speed $Vr_{rl}^*$ of the left driving wheel 14L changes in accordance with the required vehicle wheel speed $Vrc_{rl}$, and the target vehicle wheel speed $Vr_{rr}^*$ of the right driving wheel 14R changes in accordance with the required vehicle wheel speed $Vrc_{rr}$.

The target vehicle wheel speed limit range setting unit 86 sets a left target vehicle wheel speed upper limit value $Vrs_{rl\_H}$ and a left target vehicle wheel speed lower limit value $Vrs_{rl\_L}$ that limit the target vehicle wheel speed $Vr_{rl}^*$ of the left driving wheel 14L. The target vehicle wheel speed limit range of the left driving wheel 14L is set by the left target vehicle wheel speed upper limit value $Vrs_{rl\_H}$ and the left target vehicle wheel speed lower limit value $Vrs_{rl\_L}$.

The target vehicle wheel speed limit range setting unit 86 sets a right target vehicle wheel speed upper limit value $Vrs_{rr\_H}$ and a right target vehicle wheel speed lower limit value $Vrs_{rr\_L}$ that limit the target vehicle wheel speed $Vr_{rr}^*$ of the right driving wheel 14R. The target vehicle wheel speed limit range of the right driving wheel 14R is set by the right target vehicle wheel speed upper limit value $Vrs_{rr\_H}$ and the right target vehicle wheel speed lower limit value $Vrs_{rr\_L}$. The method of setting the target vehicle wheel speed limit range will be described in detail later.

According to the first embodiment, the target vehicle wheel speed setting unit 50 sets the target vehicle wheel speed $Vr_{rl}^*$ of the left driving wheel 14L and the target vehicle wheel speed $Vr_{rr}^*$ of the right driving wheel 14R in a manner so as to lie within the allowable slip range. In contrast thereto, according to the present embodiment, the target vehicle wheel speed setting unit 50 sets the target vehicle wheel speed $Vr_{rl}^*$ of the left driving wheel 14L and the target vehicle wheel speed $Vr_{rr}^*$ of the right driving wheel 14R in a manner so as to lie within the target vehicle wheel speed limit range.

The target vehicle wheel speed setting unit 50 of the present embodiment sets the target vehicle wheel speed $Vr_{rl}^*$ and the target vehicle wheel speed $Vr_{rr}^*$ in a manner similar to that of the target vehicle wheel speed setting unit 50 of the first embodiment, except that the target vehicle wheel speed limit range is used instead of the allowable slip range.

Apart therefrom, the configuration of the vehicle control device 26 is the same as the configuration of the vehicle control device 26 according to the first embodiment.

[Setting of Target Vehicle Wheel Speed Limit Range]

Figure 14:
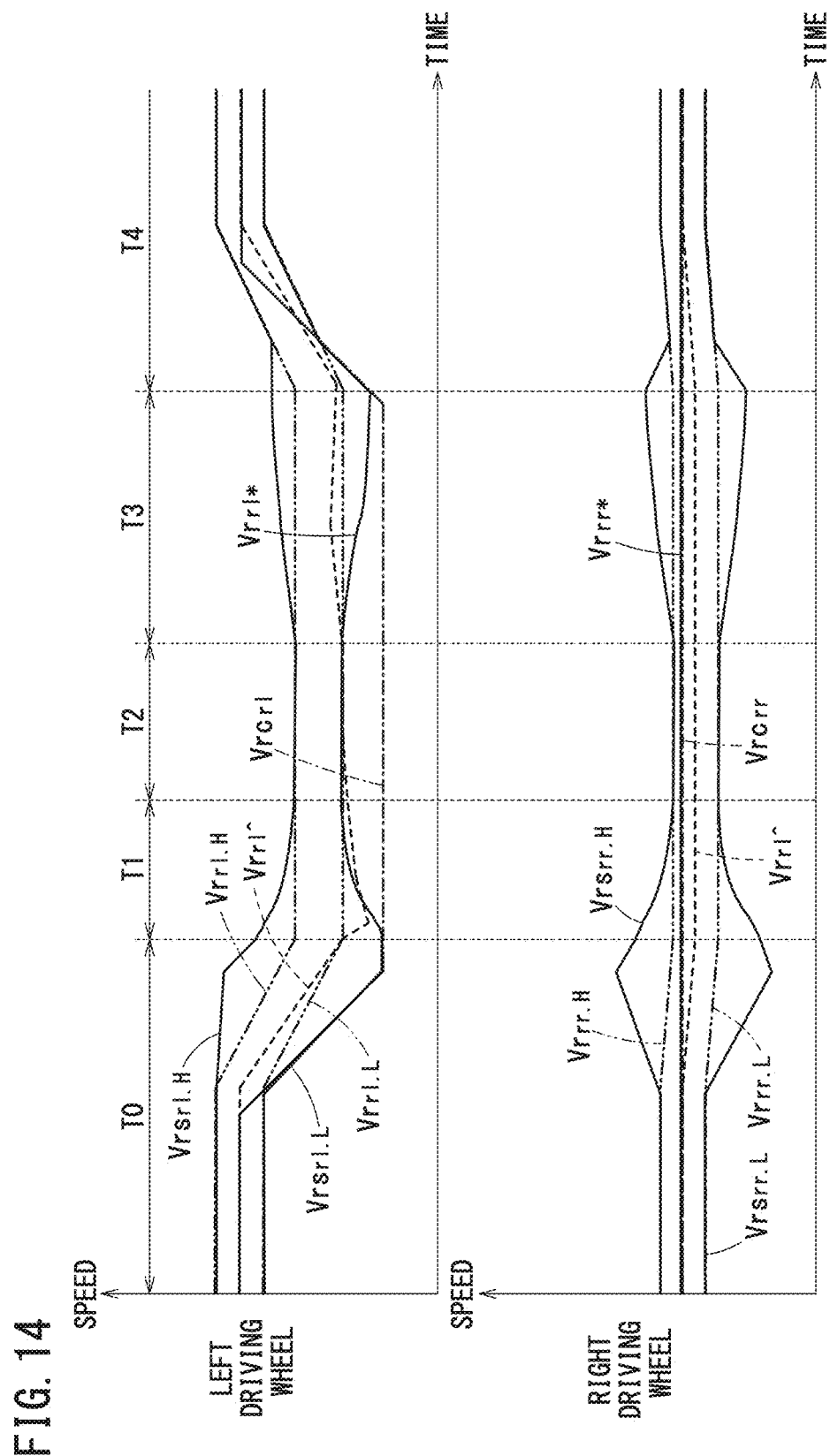
FIG. 14 is a diagram for describing a target vehicle wheel speed limit range.

FIG. 14 is a diagram for describing the target vehicle wheel speed limit range. A range between the left target vehicle wheel speed upper limit value $Vrs_{rl\_H}$ and the left target vehicle wheel speed lower limit value $Vrs_{rl\_L}$ in FIG. 14 corresponds to the target vehicle wheel speed limit range of the left driving wheel 14L. A range between the right target vehicle wheel speed upper limit value $Vrs_{rr\_H}$ and the right target vehicle wheel speed lower limit value $Vrs_{rr\_L}$ in FIG. 14 corresponds to the target vehicle wheel speed limit range of the right driving wheel 14R.

Further, a range between the left slip determination upper limit value $Vr_{rl\_H}$ and the left slip determination lower limit value $Vr_{rl\_L}$ in FIG. 14 corresponds to the allowable slip range of the left driving wheel 14L. A range between the right slip determination upper limit value $Vr_{rr\_H}$ and the right slip determination lower limit value $Vr_{rr\_L}$ in FIG. 14 corresponds to the allowable slip range of the right driving wheel 14R.

Hereinafter, a description will be given by dividing FIG. 14 into five periods of T0 to T4. The period T0 is a period in which both the left driving wheel 14L and the right driving wheel 14R are in the state of gripping, and the slip suppression control does not intervene. The period T1 is a period in which the left driving wheel 14L is in the state of slipping, and the slip suppression control intervenes. The period T2 is a period in which, since the state in which the left driving wheel 14L is slipping continues, the intervention of the slip suppression control is continued and a recovery of the gripping of the left driving wheel 14L is waited for. The period T3 is a period in which the gripping of the left driving wheel 14L is recovered, and the intervention of the slip suppression control is gradually released. The period T4 is a period in which the intervention of the slip suppression control has been released.

In the period T0, the target vehicle wheel speed limit range setting unit 86 sets the target vehicle wheel speed limit range, in a manner so that the required vehicle wheel speed $Vrc_{rl}$ and the required vehicle wheel speed $Vrc_{rr}$ are included within the target vehicle wheel speed limit range. In the case that the required vehicle wheel speed $Vrc_{rl}$ and the required vehicle wheel speed $Vrc_{rr}$ are included in the allowable slip range, the target vehicle wheel speed limit range setting unit 86 causes the target vehicle wheel speed limit range to coincide with the allowable slip range. In the case that the required vehicle wheel speed $Vrc_{rl}$ and the required vehicle wheel speed $Vrc_{rr}$ are not included in the allowable slip range, the target vehicle wheel speed limit range setting unit 86 sets the target vehicle wheel speed limit range to be larger than the allowable slip range. Therefore, in the period T0, the slip suppression control does not intervene, the target vehicle wheel speed $Vr_{rl}^*$ of the left driving wheel 14L coincides with the required vehicle wheel speed $Vrc_{rl}$, and the target vehicle wheel speed $Vr_{rr}^*$ of the right driving wheel 14R coincides with the required vehicle wheel speed $Vrc_{rr}$.

In the period T1, the target vehicle wheel speed limit range setting unit 86 brings the target vehicle wheel speed limit range closer to the allowable slip range. Consequently, although the required vehicle wheel speed $Vrc_{rl}$ of the left driving wheel 14L lies outside of the target vehicle wheel speed limit range, the target vehicle wheel speed $Vr_{rl}^*$ of the left driving wheel 14L is limited to the left target vehicle wheel speed lower limit value $Vrs_{rl\_L}$ due to the intervention of the slip suppression control.

In the period T1, the target vehicle wheel speed limit range setting unit 86 gradually brings the target vehicle wheel speed limit range closer to the allowable slip range. If the target vehicle wheel speed limit range is suddenly returned to the allowable slip range, the magnitude of the yaw rate $\hat{r}$, after having temporarily become smaller, may become larger again. More specifically, since the turning speed of the vehicle 10 becomes larger again after having temporarily become smaller, there is a concern that a feeling of discomfort may be imparted to the occupant.

In the period T2, the target vehicle wheel speed limit range setting unit 86 maintains a state in which the target vehicle wheel speed limit range is caused to coincide with the allowable slip range. Consequently, the intervention of the slip suppression control is continued, thereby maintaining the limitation on the target vehicle wheel speed $Vr_{rl}^*$ of the left driving wheel 14L, and waiting for the recovery of the gripping of the left driving wheel 14L.

In the period T3, the target vehicle wheel speed limit range setting unit 86 expands the target vehicle wheel speed limit range, and includes the required vehicle wheel speed $Vrc_{rl}$ and the required vehicle wheel speed $Vrc_{rr}$ within the target vehicle wheel speed limit range.

In the period T3, the target vehicle wheel speed limit range setting unit 86 gradually expands the target vehicle wheel speed limit range. If the target vehicle wheel speed limit range is suddenly expanded, the left driving wheel 14L may slip again, and the intervention and releasing of the slip suppression control may be repeatedly carried out. Therefore, there is a concern that the vehicle 10 may repeatedly accelerate and decelerate in the frontward/rearward direction or in the turning direction, and a feeling of discomfort may be imparted to the occupant.

In the period T4, the target vehicle wheel speed limit range setting unit 86 sets the target vehicle wheel speed limit range, in a manner so that the required vehicle wheel speed $Vrc_{rl}$ and the required vehicle wheel speed $Vrc_{rr}$ are included within the target vehicle wheel speed limit range. In the case that the required vehicle wheel speed $Vrc_{rl}$ and the required vehicle wheel speed $Vrc_{rr}$ are included in the allowable slip range, the target vehicle wheel speed limit range setting unit 86 causes the target vehicle wheel speed limit range to coincide with the allowable slip range. In the case that the required vehicle wheel speed $Vrc_{rl}$ and the required vehicle wheel speed $Vrc_{rr}$ are not included in the allowable slip range, the target vehicle wheel speed limit range setting unit 86 sets the target vehicle wheel speed limit range to be larger than the allowable slip range. Therefore, in the period T4, the slip suppression control does not intervene, the target vehicle wheel speed $Vr_{rl}*$ of the left driving wheel 14L coincides with the required vehicle wheel speed $Vrc_{rl}$, and the target vehicle wheel speed $Vr_{rr}*$ of the right driving wheel 14R coincides with the required vehicle wheel speed $Vrc_{rr}$.

The left target vehicle wheel speed upper limit value $Vrs_{rl.H}$, the left target vehicle wheel speed lower limit value $Vrs_{rl.L}$, the right target vehicle wheel speed upper limit value $Vrs_{rr.H}$, and the right target vehicle wheel speed lower limit value $Vrs_{rr.L}$, which define the target vehicle wheel speed limit range, are expressed by the following Equation (23) to Equation (26) using a slip speed correction term St (≥0).

$$Vrs_{rl.H} = Vr_{rl.H} + St \quad (23)$$

$$Vrs_{rl.L} = Vr_{rl.L} - St \quad (24)$$

$$Vrs_{rr.H} = Vr_{rr.H} + St \quad (25)$$

$$Vrs_{rr.L} = Vr_{rr.L} - St \quad (26)$$

In the case that the slip speed correction term St is 0 (zero), the target vehicle wheel speed limit range coincides with the allowable slip range. The target vehicle wheel speed limit range setting unit 86 determines a slip speed correction term initial value St1 in a manner so that the required vehicle wheel speed $Vrc_{rl}$ and the required vehicle wheel speed $Vrc_{rr}$ are included. The target vehicle wheel speed limit range setting unit 86, by causing the slip speed correction term St to be changed between 0 (zero) and the slip speed correction term initial value St1, adjusts the intervention of the slip suppression control.

Moreover, the slip speed correction term St with respect to the target vehicle wheel speed limit range of the left driving wheel 14L, and the slip speed correction term St with respect to the target vehicle wheel speed limit range of the right driving wheel 14R have the same value. Consequently, it is possible to equalize the effect of the change in the target vehicle wheel speed limit range on the target vehicle wheel speed $Vr_{rl}*$ of the left driving wheel 14L and the target vehicle wheel speed $Vr_{rr}*$ of the right driving wheel 14R.

Figure 15:
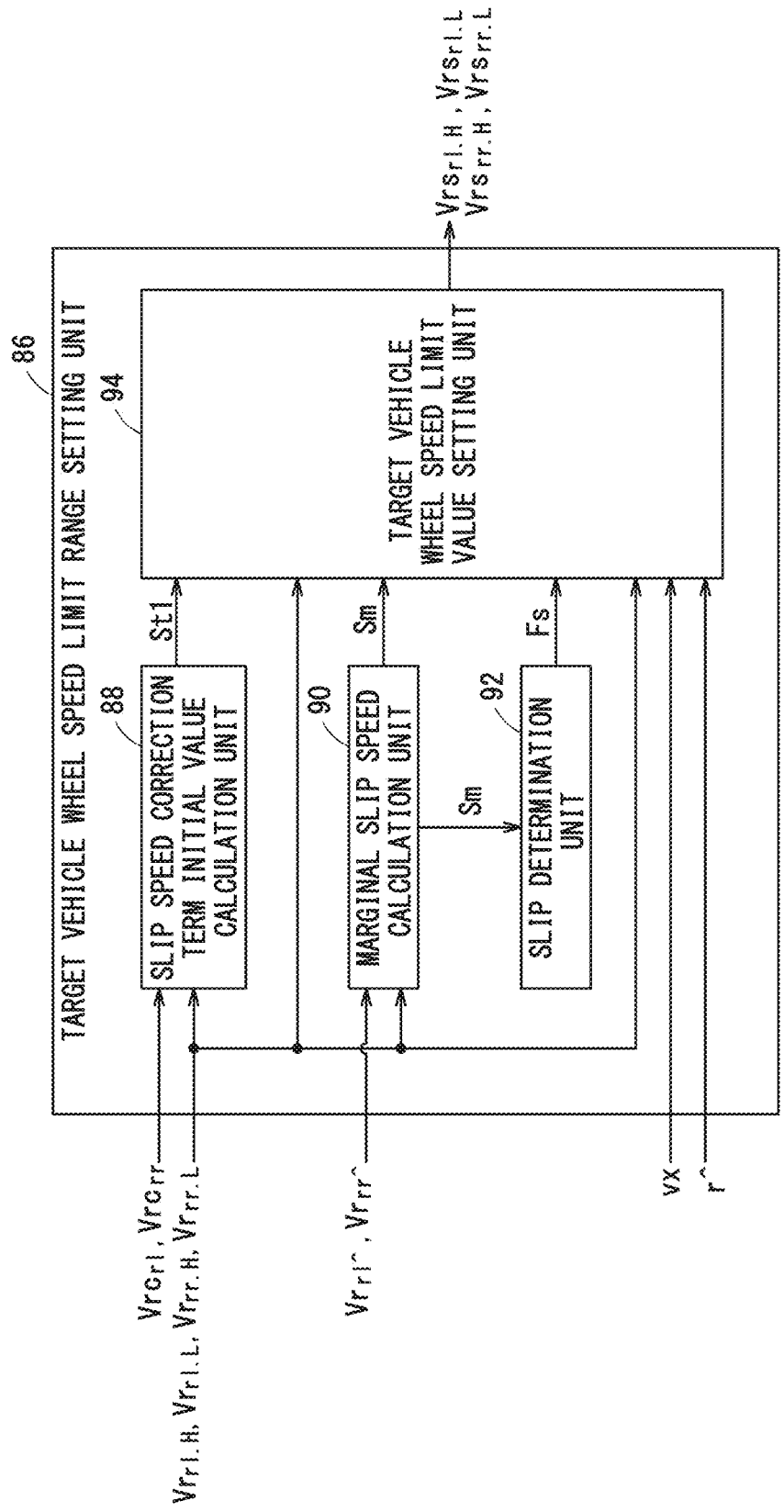
FIG. 15 is a block diagram of a target vehicle wheel speed limit range setting unit.

FIG. 15 is a block diagram of the target vehicle wheel speed limit range setting unit 86. The target vehicle wheel speed limit range setting unit 86 includes a slip speed correction term initial value calculation unit 88, a marginal slip speed calculation unit 90, a slip determination unit 92, and a target vehicle wheel speed limit value setting unit 94.

The slip speed correction term initial value calculation unit 88 calculates the slip speed correction term initial value St1, using the required wheel speed $Vrc_{rl}$, the required wheel speed $Vrc_{rr}$, the left slip determination upper limit value $Vr_{rl.H}$, the left slip determination lower limit value $Vr_{rl.L}$, the right slip determination upper limit value $Vr_{rr.H}$, and the right slip determination lower limit value $Vr_{rr.L}$.

Figure 16:
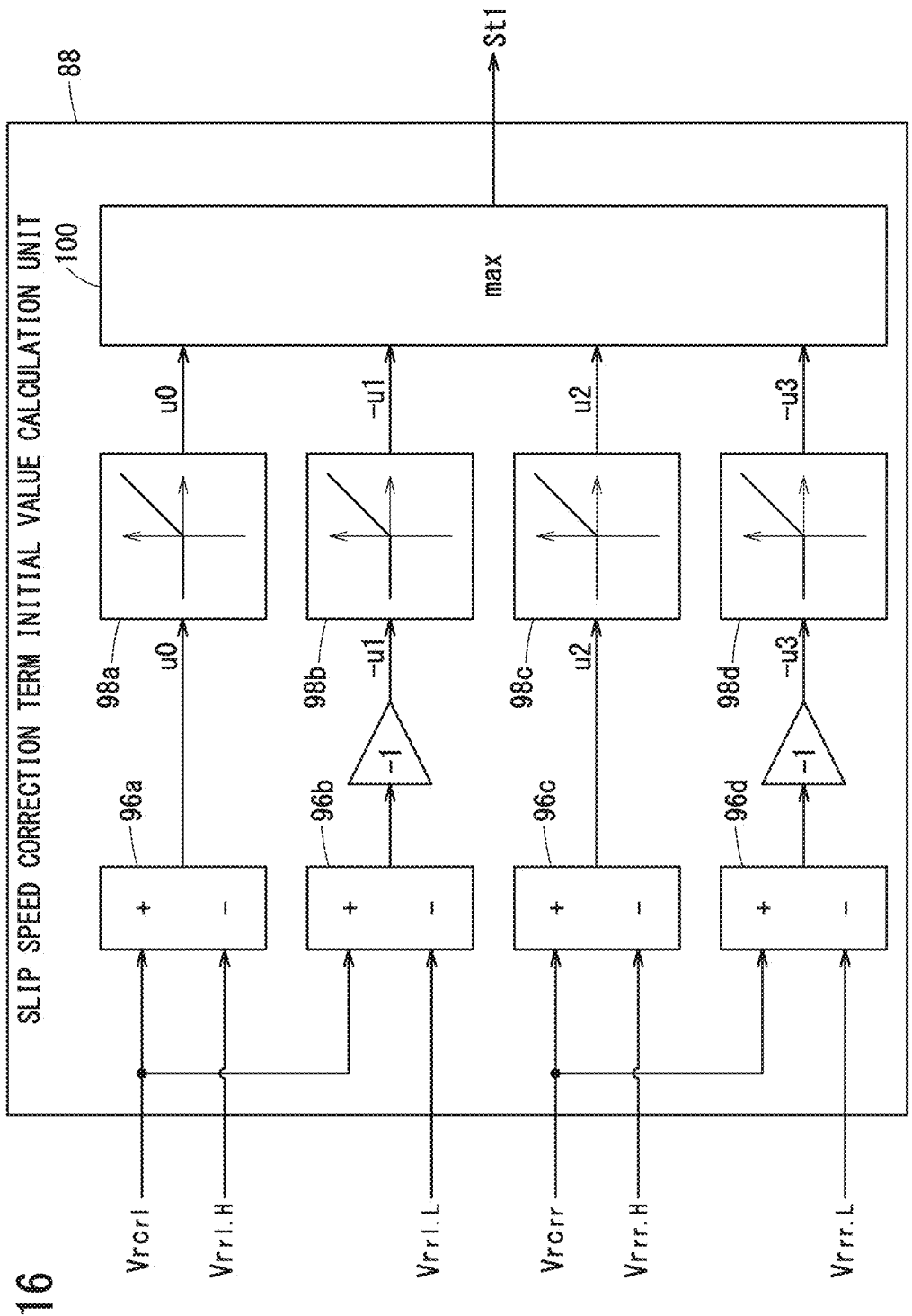
FIG. 16 is a block diagram of a slip speed correction term initial value calculation unit.

FIG. 16 is a block diagram of the slip speed correction term initial value calculation unit 88. The slip speed correction term initial value calculation unit 88 includes adding/subtracting devices 96a to 96d, filters 98a to 98d, and a maximum deviation selection unit 100.

In the adding/subtracting device 96a, a deviation u0 of the required vehicle wheel speed $Vrc_{rl}$ with respect to the left slip determination upper limit value $Vr_{rl.H}$ is calculated. In the adding/subtracting device 96b, a deviation u1 of the required vehicle wheel speed $Vrc_{rl}$ with respect to the left slip determination lower limit value $Vr_{rl.L}$ is calculated. In the adding/subtracting device 96c, a deviation u2 of the required vehicle wheel speed $Vrc_{rr}$ with respect to the right slip determination upper limit value $Vr_{rr.H}$ is calculated. In the adding/subtracting device 96d, a deviation u3 of the required vehicle wheel speed $Vrc_{rr}$ with respect to the right slip determination lower limit value $Vr_{rr.L}$ is calculated.

The deviation u0 is processed in the filter 98a, and if the deviation u0 is a positive value, it is output without change to the maximum deviation selection unit 100, and if the deviation u0 is a value less than or equal to 0 (zero), a value of 0 (zero) is output as the deviation u0 to the maximum deviation selection unit 100.

The deviation u1 is processed in the filter 98b after the sign thereof is inverted, and if the deviation −u1 is a positive value, it is output without change to the maximum deviation selection unit 100, and if the deviation −u1 is a value less than or equal to 0 (zero), a value of 0 (zero) is output as the deviation −u1 to the maximum deviation selection unit 100.

The deviation u2 is processed in the filter 98c, and if the deviation u2 is a positive value, it is output without change to the maximum deviation selection unit 100, and if the deviation u2 is a value less than or equal to 0 (zero), a value of 0 (zero) is output as the deviation u2 to the maximum deviation selection unit 100.

The deviation u3 is processed in the filter 98d after the sign thereof is inverted, and if the deviation −u3 is a positive value, it is output without change to the maximum deviation selection unit 100, and if the deviation −u3 is a value less than or equal to 0 (zero), a value of 0 (zero) is output as the deviation −u3 to the maximum deviation selection unit 100.

The maximum deviation selection unit 100 selects the largest value from among the deviation u0, the deviation −u1, the deviation u2, and the deviation −u3, and outputs the selected value as the slip speed correction term initial value St1.

The marginal slip speed calculation unit 90 calculates a marginal slip speed Sm. The marginal slip speed Sm is a marginal degree of the vehicle wheel speed with respect to a slip determination vehicle wheel speed. The marginal slip speed Sm can be determined by the following equation (27).

$$Sm = \min(Sm_{rl}, Sm_{rr}) \tag{27}$$

$$Sm_{rl} = \begin{cases} Vr_{rl\cdot H} - Vr_{rl}(Vr_{rl} \geq 0.5(Vr_{rl\cdot H} + Vr_{rl\cdot L})) \\ Vr_{rl} - Vr_{rl\cdot L}(Vr_{rl} < 0.5(Vr_{rl\cdot H} + Vr_{rl\cdot L})) \end{cases}$$

$$Sm_{rr} = \begin{cases} Vr_{rr\cdot H} - Vr_{rr}(Vr_{rr} \geq 0.5(Vr_{rr\cdot H} + Vr_{rr\cdot L})) \\ Vr_{rr} - Vr_{rr\cdot L}(Vr_{rr} < 0.5(Vr_{rr\cdot H} + Vr_{rr\cdot L})) \end{cases}$$

Returning to FIG. 15, the slip determination unit 92 sets a slip determination flag Fs based on the marginal slip speed Sm. The slip determination flag Fs is set based on the following equation (28).

$$Fs = \begin{cases} 0 \, (Sm \geq 0) \\ 1 \, (Sm < 0) \end{cases} \tag{28}$$

In the case that both the left driving wheel 14L and the right driving wheel 14R are gripping, the marginal slip speed Sm becomes greater than or equal to 0 (zero). In the case that at least one of the left driving wheel 14L or the right driving wheel 14R is slipping, the marginal slip speed Sm becomes smaller than 0 (zero). More specifically, in the case that both the left driving wheel 14L and the right driving wheel 14R are gripping, the slip determination flag Fs becomes 0 (zero), whereas in the case that at least one of the left driving wheel 14L or the right driving wheel 14R is slipping, the slip determination flag Fs becomes 1.

The target vehicle wheel speed limit value setting unit 94 sets the left target vehicle wheel speed upper limit value $Vrs_{rl\cdot H}$, the left target vehicle wheel speed lower limit value $Vrs_{rl\cdot L}$, the right target vehicle wheel speed upper limit value $Vrs_{rr\cdot H}$, and the right target vehicle wheel speed lower limit value $Vrs_{rr\cdot L}$.

Figure 17:
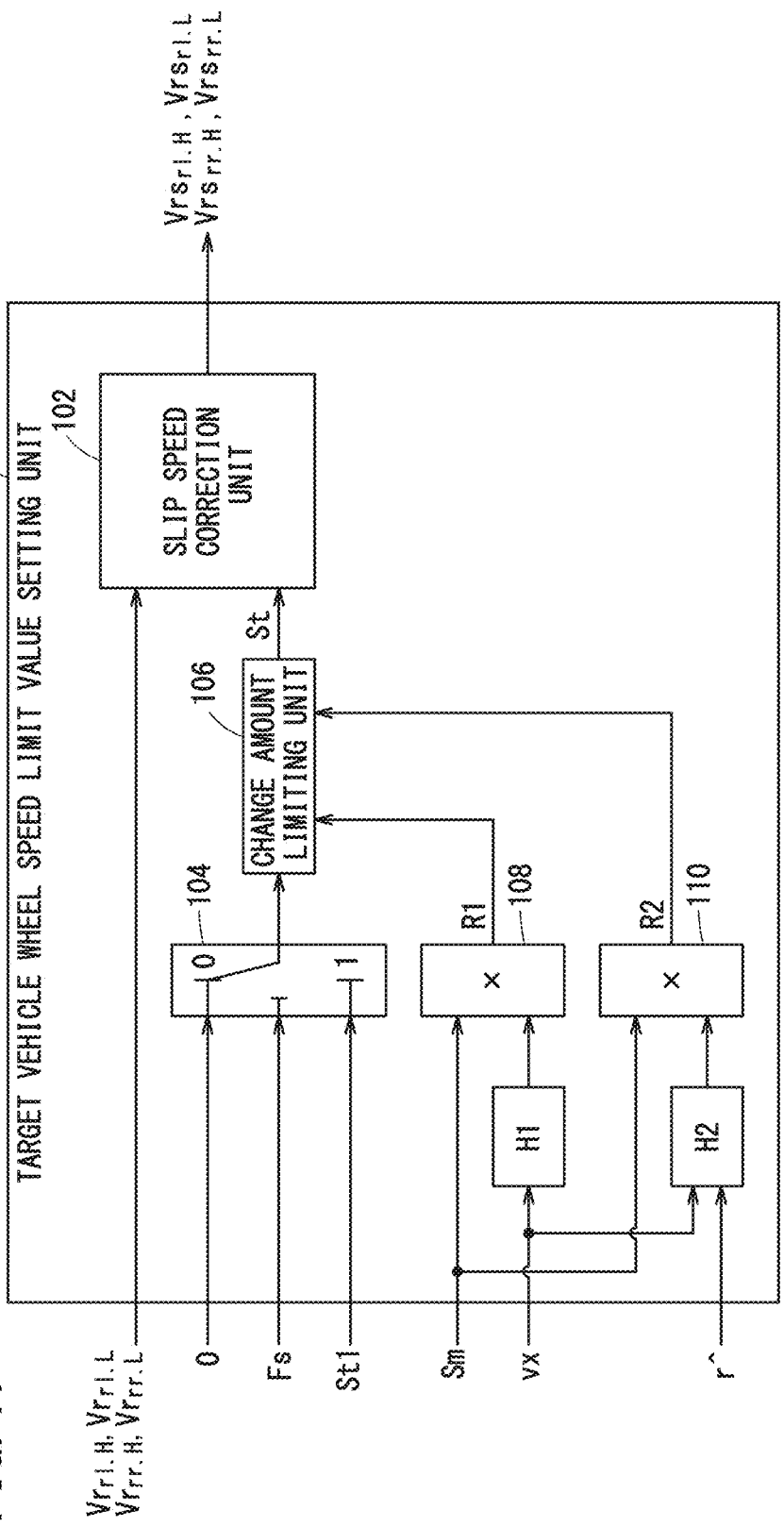
FIG. 17 is a block diagram of a target vehicle wheel speed limit value setting unit.

FIG. 17 is a block diagram of the target vehicle wheel speed limit value setting unit 94. The target vehicle wheel speed limit value setting unit 94 includes a slip speed correction unit 102, an initial value selection unit 104, a change amount limiting unit 106, a multiplying device 108, and a multiplying device 110.

Based on the aforementioned Equation (23) to Equation (26), the slip speed correction unit 102 calculates the left target vehicle wheel speed upper limit value $Vrs_{rl\cdot H}$, the left target vehicle wheel speed lower limit value $Vrs_{rl\cdot L}$, the right target vehicle wheel speed upper limit value $Vrs_{rr\cdot H}$, and the right target vehicle wheel speed lower limit value $Vrs_{rr\cdot L}$.

The initial value selection unit 104 outputs 0 (zero) in the case that at least one of the left driving wheel 14L or the right driving wheel 14R is slipping (Fs=0). The initial value selection unit 104 outputs the slip speed correction term initial value St1 in the case that both the left driving wheel 14L and the right driving wheel 14R are gripping (Fs=1).

Figure 18:
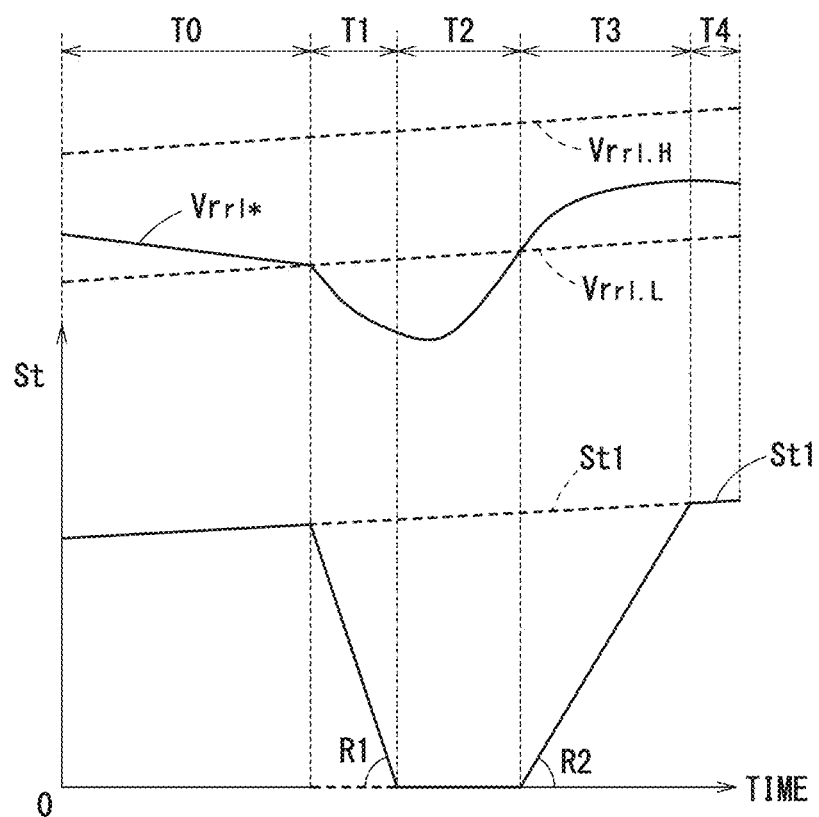
FIG. 18 is a diagram showing an example of a change over time of the slip speed correction term.

FIG. 18 is a diagram showing an example of a change over time of the slip speed correction term St. FIG. 18 shows an example of a case in which the slip suppression control intervenes with respect to the left driving wheel 14L. The periods T0 to T4 shown in FIG. 18 correspond to the periods T0 to T4 shown in FIG. 14.

In the case of decreasing the slip speed correction term St (period T1), the change amount limiting unit 106 limits the amount of decrease of the slip speed correction term St. Further, in the case of increasing the slip speed correction term St (period T3), the change amount limiting unit 106 limits the amount of increase of the slip speed correction term St. By limiting the amount of change in the slip speed correction term St, a sudden change in the target vehicle wheel speed limit range is suppressed.

Returning to FIG. 17, the multiplying device 108 calculates an intervention rate limit value R1. The intervention rate limit value R1 is a value that defines a maximum value of a rate of decrease of the slip speed correction term St. Based on the intervention rate limit value R1, the change amount limiting unit 106 limits the rate of decrease of the slip speed correction term St. The intervention rate limit value R1 can be determined by the following Equation (29).

$$R1 = H1 \cdot Sm \tag{29}$$

Figure 19:
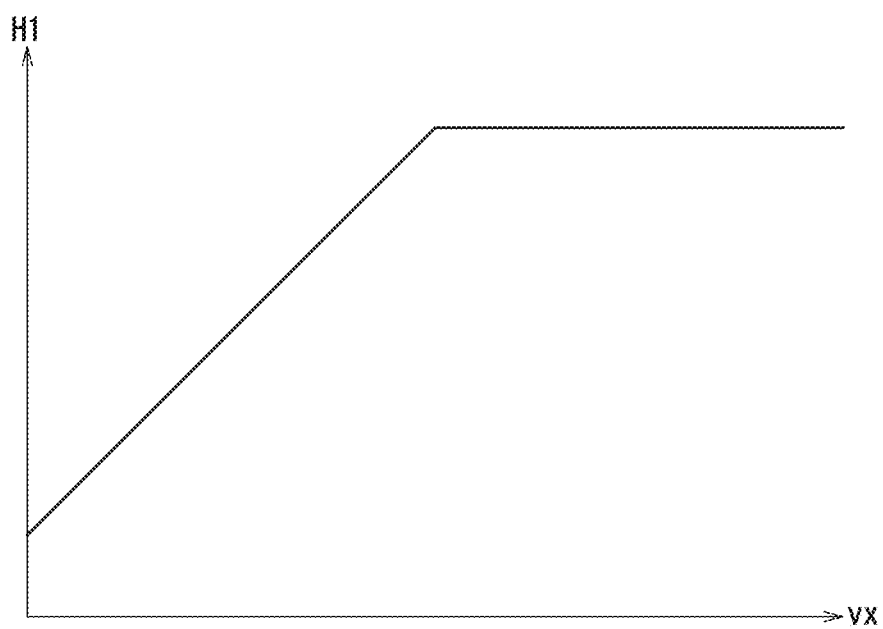
FIG. 19 is a gain map.

"H1" in Equation (29) is a gain. FIG. 19 is a map of the gain H1. The gain H1 is set to a larger value as the vehicle body speed vx becomes larger. In the case that the driving wheels are slipping, the marginal slip speed Sm becomes a negative value, and as the slip ratio of the driving wheels becomes larger, the absolute value of the marginal slip speed Sm becomes larger. Therefore, as the slip ratio of the driving wheels becomes larger, or alternatively, as the vehicle body speed vx becomes larger, the absolute value of the intervention rate limit value R1 becomes a larger negative value. In the case that the slip ratio of the driving wheels is large, the control amount of the slip suppression control is increased at an early stage, and thereby the behavior of the vehicle 10 is stabilized. Further, in a situation in which the vehicle body speed vx is large and the slip ratio of the driving wheels becomes further larger, the control amount of the slip suppression control is increased at an early stage, thereby suppressing the slip ratio of the driving wheels from becoming further larger.

The multiplying device 110 calculates a release rate limit value R2. The release rate limit value R2 is a value that defines a maximum value of a rate of increase of the slip speed correction term St. Based on the release rate limit value R2, the change amount limiting unit 106 limits the amount of increase of the slip speed correction term St. The release rate limit value R2 can be determined by the following Equation (30).

$$R2 = H2 \cdot Sm \tag{30}$$

Figure 20:
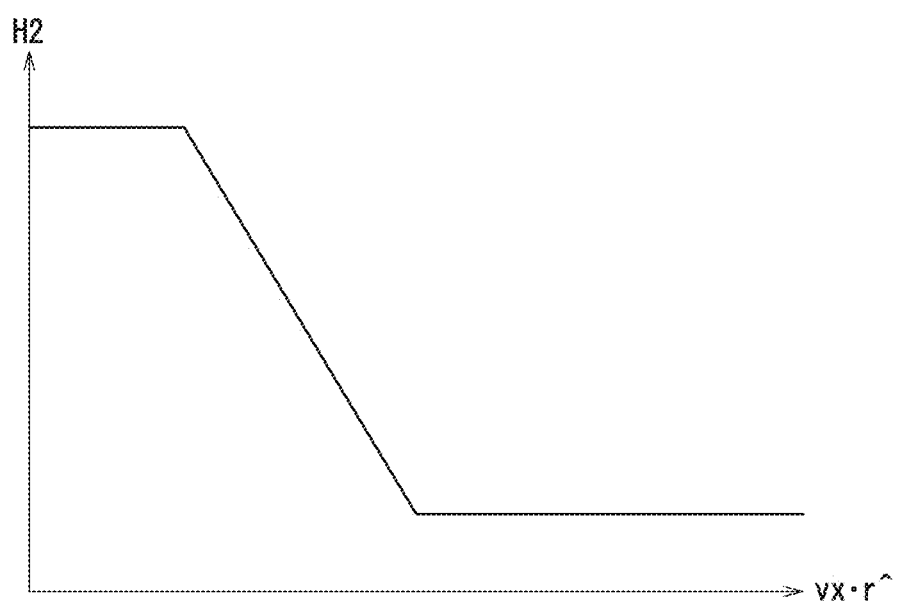
FIG. 20 is a gain map.

"H2" in Equation (30) is a gain. FIG. 20 is a map of the gain H2. The gain H2 is set to a larger value as the vehicle body speed vx becomes smaller, and as the yaw rate r^ becomes smaller. In the case that the driving wheels are gripping, the marginal slip speed Sm becomes a positive value, and as the slip ratio of the driving wheels becomes smaller, the marginal slip speed Sm becomes larger. Therefore, as the slip ratio of the driving wheels becomes smaller, or alternatively, as the vehicle body speed vx becomes smaller, or alternatively, as the yaw rate r^ becomes smaller, the absolute value of the release rate limit value R2 becomes a larger positive value. In the case that the slip ratio of the driving wheels is small, since the gripping of the driving wheels is recovered, the control amount of the slip suppression control is reduced at an early stage, and thereby the target vehicle speed V* and the target yaw rate r* are realized. Further, in the case that the vehicle body speed vx is small and the yaw rate r^ is small, since the possibility that the slip ratio of the driving wheels will further become larger is low, the control amount of the slip suppression control is reduced at an early stage, and thereby the target vehicle speed V* and the target yaw rate r* are realized.

[Driving Motor Control]

Figure 21:
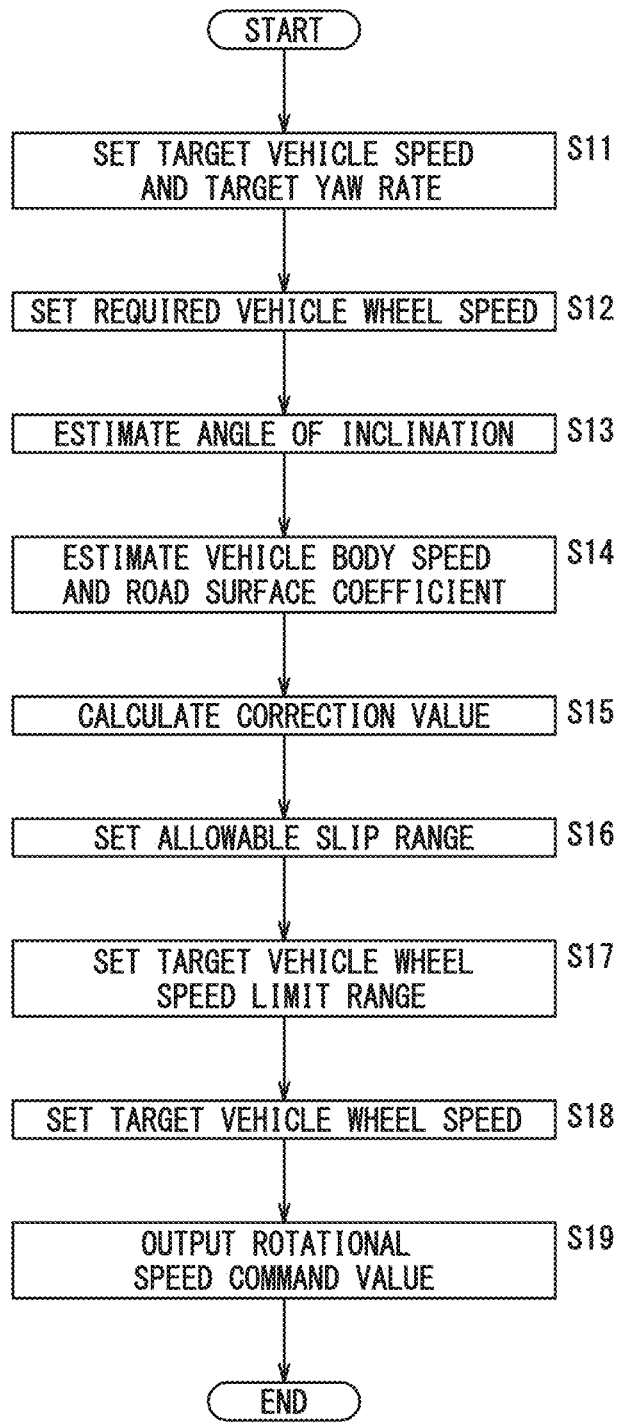
FIG. 21 is a flowchart of a driving motor control performed in the vehicle control device.

FIG. 21 is a flowchart of the driving motor control performed in the vehicle control device 26. The driving motor control is repeatedly executed at a predetermined cycle.

In step S11, the target value setting unit 32 sets the target vehicle speed V* and the target yaw rate r* based on an operated amount of the operating levers 18. Thereafter, the process transitions to step S12.

In step S12, the required vehicle wheel speed setting unit 84 sets the required vehicle wheel speed $Vrc_{rl}$ on of the left driving wheel 14L and the required vehicle wheel speed $Vrc_{rr}$ of the right driving wheel 14R based on an operated amount of the operating levers 18. Thereafter, the process transitions to step S13.

In step S13, the estimation unit 34 estimates the angle of inclination of the vehicle 10 based on the roll rate p^, the pitch rate q^, the yaw rate r^, the frontward/rearward acceleration ax^, the lateral acceleration ay^, and the upper/lower acceleration az^. Thereafter, the process transitions to step S14.

In step S14, the estimation unit 34 estimates the vehicle body speed vx, the road surface coefficient $\lambda_{rl}$, and the road surface coefficient $\lambda_{rr}$ based on the rotational speed $\theta'w_{rl}{}^{\wedge}$ and the driving torque $TD_{rl}{}^{\wedge}$ of the left driving wheel 14L, the rotational speed $\theta'w_{rr}{}^{\wedge}$ and the driving torque $TD_{rr}{}^{\wedge}$ of the right driving wheel 14R, the frontward/rearward acceleration ax^, and the yaw rate r^. Thereafter, the process transitions to step S15.

In step S15, the correction value calculation unit 46 calculates the correction value $V_{FBAdd}$. Thereafter, the process transitions to step S16.

In step S16, the allowable slip range setting unit 48 calculates the left slip determination upper limit value $Vr_{rl,H}$ and the left slip determination lower limit value $Vr_{rl,L}$, and sets the allowable slip range of the left driving wheel 14L. Further, the allowable slip range setting unit 48 calculates the right slip determination upper limit value $Vr_{rr,H}$ and the right slip determination lower limit value $Vr_{rr,L}$, and sets the allowable slip range of the right driving wheel 14R. Thereafter, the process transitions to step S17.

In step S17, the target vehicle wheel speed limit range setting unit 86 calculates the left target vehicle wheel speed upper limit value $Vrs_{rl,H}$ and the left target vehicle wheel speed lower limit value $Vrs_{rl,L}$, and sets the target vehicle wheel speed limit range of the left driving wheel 14L. Further, the target vehicle wheel speed limit range setting unit 86 calculates the right target vehicle wheel speed upper limit value $Vrs_{rr,H}$ and the right target vehicle wheel speed lower limit value $Vrs_{rr,L}$, and sets the target vehicle wheel speed limit range of the right driving wheel 14R. Thereafter, the process transitions to step S18.

In step S18, the target vehicle wheel speed setting unit 50 sets, within the target vehicle wheel speed limit range of the left driving wheel 14L, the target vehicle wheel speed $Vr_{rl}*$ of the left driving wheel 14L, based on the target vehicle speed V* and the target yaw rate r*. Further, the target vehicle wheel speed setting unit 50 sets, within the target vehicle wheel speed limit range of the right driving wheel 14R, the target vehicle wheel speed $Vr_{rr}*$ of the right driving wheel 14R, based on the target vehicle speed V* and the target yaw rate r*. Thereafter, the process transitions to step S19.

In step S19, the rotational speed control unit 52 sets the rotational speed command value $\theta'dw_{rl}*$ of the left driving motor 16L and the rotational speed command value $\theta'dw_{rr}*$ of the right driving motor 16R, based on the target vehicle wheel speed $Vr_{rl}*$ of the left driving wheel 14L, the target vehicle wheel speed $Vr_{rr}*$ of the right driving wheel 14R, the rotational speed $\theta'w_{rl}{}^{\wedge}$ of the left driving motor 16L, and the rotational speed $\theta'w_{rr}{}^{\wedge}$ of the right driving motor 16R. The rotational speed control unit 52 outputs the rotational speed command value $\theta'dw_{rl}*$ and the rotational speed command value $\theta'dw_{rr}*$ to the motor driver 36. Thereafter, the driving motor control comes to an end.

In relation to the disclosure provided above, the following supplementary notes are further disclosed.

Supplementary Note 1

Provided is the vehicle control device (26) that controls the vehicle (10) including the left driving motor (16L) that drives the left driving wheel (14L), and the right driving motor (16R) that drives the right driving wheel (14R), the vehicle (10) being capable of turning based on the difference between the vehicle wheel speed of the left driving wheel and the vehicle wheel speed of the right driving wheel, the vehicle control device (26) including the target value setting unit (32) that sets the target vehicle speed and the target yaw rate, the understeering determination unit (42) that determines whether or not the vehicle is in the understeering state, based on a deviation between the yaw rate corresponding to the target yaw rate and the actual yaw rate of the vehicle, the correction value calculation unit (46) that calculates, in the case it is determined that the vehicle is in the understeering state, the correction value for causing the target vehicle speed to be corrected and lowered, the correction value being calculated based on the deviation, the target vehicle wheel speed setting unit (50) that sets the target vehicle wheel speed of the left driving wheel and the target vehicle wheel speed of the right driving wheel based on the target vehicle speed, the target yaw rate, and the correction value, and the rotational speed control unit (52) that controls the rotational speed of the left driving motor based on the target vehicle wheel speed of the left driving wheel, and controls the rotational speed of the right driving motor based on the target vehicle wheel speed of the right driving wheel. In accordance with such a configuration, in the case it is determined that the vehicle is in the understeering state, since the target vehicle speed is corrected and lowered by the correction value, the centrifugal force that acts on the vehicle becomes smaller, and an expansion of the turning radius of the vehicle can be suppressed.

Supplementary Note 2

In the vehicle control device according to supplementary note 1, there may further be provided the nominal yaw rate calculation unit (40) that calculates, as the yaw rate corresponding to the target yaw rate, the nominal yaw rate which is an estimated value of the yaw rate that the vehicle is capable of generating while traveling on a dry asphalt road surface. In accordance with such a configuration, based on the yaw rate that can actually be generated in the vehicle, it is possible to determine whether or not the vehicle is in the understeering state.

Supplementary Note 3

In the vehicle control device according to supplementary note 2, the nominal yaw rate calculation unit may delay the phase of the nominal yaw rate with respect to the phase of the target yaw rate. In accordance with such a configuration, based on the yaw rate that can actually be generated in the vehicle, it is possible to determine whether or not the vehicle is in the understeering state.

Supplementary Note 4

In the vehicle control device according to supplementary note 3, the nominal yaw rate determination unit may be equipped with the steering determination unit (56) that determines, based on the target yaw rate and the differential value of the target yaw rate, whether the magnitude of the actual yaw rate is in the process of increasing or in the process of decreasing, and the nominal yaw rate calculation unit may make the delay of the phase of the nominal yaw rate with respect to the phase of the target yaw rate in the case it is determined that the actual yaw rate is in the process of increasing, larger than the delay of the phase of the nominal yaw rate with respect to the phase of the target yaw rate in the case it is determined that the actual yaw rate is in the process of decreasing. In accordance with such a configuration, based on the yaw rate that can actually be generated in the vehicle, it is possible to determine whether or not the vehicle is in the understeering state.

Supplementary Note 5

In the vehicle control device according to supplementary note 1, there may further be provided the change amount limiting unit (82) that limits the amount of change in the correction value based on the deviation. In accordance with such a configuration, since a sudden change of the target vehicle speed that is corrected by the correction value can be suppressed, a deterioration in the operability of the vehicle, and the riding comfort of the vehicle or the like can be suppressed.

Supplementary Note 6

In the vehicle control device according to supplementary note 1, there may further be provided the allowable slip range setting unit (48) that sets the allowable slip range of the left driving wheel based on the left slip determination upper limit value and the left slip determination lower limit value for determining the slip of the left driving wheel based on the vehicle wheel speed of the left driving wheel, and sets the allowable slip range of the right driving wheel based on the right slip determination upper limit value and the right slip determination lower limit value for determining the slip of the right driving wheel based on the vehicle wheel speed of the right driving wheel, and the target vehicle wheel speed setting unit may set the target vehicle wheel speed of the left driving wheel within the range corresponding to the allowable slip range of the left driving wheel based on the target vehicle speed, the target yaw rate, and the correction value, and may set the target vehicle wheel speed of the right driving wheel within the range corresponding to the allowable slip range of the right driving wheel based on the target vehicle speed, the target yaw rate, and the correction value. In accordance with such a configuration, slippage of the left driving wheel and the right driving wheel can be suppressed.

Supplementary Note 7

In the vehicle control device according to supplementary note 6, there may further be provided the target vehicle wheel speed limit range setting unit (86) that sets, according to the allowable slip range of the left driving wheel, the target vehicle wheel speed limit range for limiting the target vehicle wheel speed of the left driving wheel, and sets, according to the allowable slip range of the right driving wheel, the target vehicle wheel speed limit range for limiting the target vehicle wheel speed of the right driving wheel, and the target vehicle wheel speed setting unit may set the target vehicle wheel speed of the left driving wheel within the target vehicle wheel speed limit range of the left driving wheel based on the target vehicle speed, the target yaw rate, and the correction value, and may set the target vehicle wheel speed of the right driving wheel within the target vehicle wheel speed limit range of the right driving wheel based on the target vehicle speed, the target yaw rate, and the correction value, in the case that the vehicle wheel speed of the left driving wheel lies within the allowable slip range of the left driving wheel, and further, the vehicle wheel speed of the right driving wheel lies within the allowable slip range of the right driving wheel, the target vehicle wheel speed limit range setting unit may set the target vehicle wheel speed limit range of the left driving wheel to a range that is larger than the allowable slip range of the left driving wheel, and set the target vehicle wheel speed limit range of the right driving wheel to a range that is larger than the allowable slip range of the right driving wheel, and in the case that the vehicle wheel speed of the left driving wheel lies outside of the allowable slip range of the left driving wheel, or the vehicle wheel speed of the right driving wheel lies outside of the allowable slip range of the right driving wheel, the target vehicle wheel speed limit range setting unit may set the target vehicle wheel speed limit range of the left driving wheel to the same range as the allowable slip range of the left driving wheel, and set the target vehicle wheel speed limit range of the right driving wheel to the same range as the allowable slip range of the right driving wheel. In accordance with such a configuration, in the case that both the left driving wheel and the right driving wheel are gripping, the target vehicle speed and the target yaw rate of the vehicle can be realized without the intervention of the slip suppression control. On the other hand, in the case that at least one of the left driving wheel or the right driving wheel has slipped, such slippage can be suppressed.

Supplementary Note 8

In the vehicle control device according to supplementary note 7, in the case that a transition is made from a state in which the vehicle wheel speed of the left driving wheel lies within the allowable slip range of the left driving wheel, and further, the vehicle wheel speed of the right driving wheel lies within the allowable slip range of the right driving wheel, to a state in which the vehicle wheel speed of the left driving wheel lies outside of the allowable slip range of the left driving wheel, or the vehicle wheel speed of the right driving wheel lies outside of the allowable slip range of the right driving wheel, the target vehicle wheel speed limit range setting unit may gradually bring the target vehicle wheel speed limit range of the left driving wheel closer to the allowable slip range of the left driving wheel, and gradually bring the target vehicle wheel speed limit range of the right driving wheel closer to the allowable slip range of the right driving wheel. In accordance with such a configuration, the slip suppression control is gradually caused to intervene, thereby making it possible to stabilize the vehicle behavior.

Supplementary Note 9

In the vehicle control device according to supplementary note 7, in the case that a transition is made from a state in which the vehicle wheel speed of the left driving wheel lies outside of the allowable slip range of the left driving wheel, or the vehicle wheel speed of the right driving wheel lies outside of the allowable slip range of the right driving wheel, to a state in which the vehicle wheel speed of the left driving wheel lies within the allowable slip range of the left driving wheel, and further, the vehicle wheel speed of the right driving wheel lies within the allowable slip range of the right driving wheel, the target vehicle wheel speed limit range setting unit may gradually increase the target vehicle wheel speed limit range of the left driving wheel, and gradually increase the target vehicle wheel speed limit range of the right driving wheel. In accordance with such a configuration, the intervention of the slip suppression control is gradually released, thereby making it possible to stabilize the vehicle behavior.

Supplementary Note 10

In the vehicle control device according to supplementary note 6, the vehicle control device may further be equipped with the estimation unit (34) that estimates the vehicle body speed, the left road surface coefficient that is the road surface coefficient between the left driving wheel and the ground contact road surface, and the right road surface coefficient that is the road surface coefficient between the right driving wheel and the ground contact road surface, based on the rotational speed of the left driving wheel, the driving torque of the left driving wheel, the rotational speed of the right driving wheel, the driving torque of the right driving wheel, the frontward/rearward acceleration of the vehicle, and the actual yaw rate, and the allowable slip range setting unit may set the left slip determination upper limit value and the left slip determination lower limit value based on the vehicle body speed estimated value that is the vehicle body speed that has been estimated, and the left road surface coefficient estimated value that is the left road surface coefficient that has been estimated, and may set the right slip determination upper limit value and the right slip determination lower limit value based on the vehicle body speed estimated value, and the right road surface coefficient estimated value that is the right road surface coefficient that has been estimated. In accordance with such a configuration, the vehicle body speed can be estimated with high accuracy.

Supplementary Note 11

In the vehicle control device according to supplementary note 10, the first state equation that includes, as state quantities, the vehicle body speed estimated value, the left road surface coefficient estimated value, and the right road surface coefficient estimated value, and the observation equation that includes, as observed quantities, the observed value of the rotational speed of the left driving wheel, the observed value of the rotational speed of the right driving wheel, the observed value of the frontward/rearward acceleration of the vehicle, and the observed value of the actual yaw rate may be set based on the dynamic model of the vehicle, the dynamic model of the left driving wheel, and the dynamic model of the right driving wheel, and the estimation unit may process the first state equation and the observation equation using the first parameter estimation method to thereby estimate the vehicle body speed, the left road surface coefficient, and the right road surface coefficient. In accordance with such a configuration, the vehicle body speed of the vehicle can be estimated with high accuracy.

Supplementary Note 12

In the vehicle control device according to supplementary note 11, the first state equation may include the estimated value of the angle of inclination of the vehicle, the second state equation that includes the estimated value of the angle of inclination as the state quantity, and the observation relational expression indicating the relationship between the observed value of the angle of inclination and the observed value of the acceleration of the vehicle may be set based on the dynamic model of the vehicle, and the estimation unit may process the second state equation and the observation relational expression using the second parameter estimation method to thereby estimate the angle of inclination. In accordance with such a configuration, the angle of inclination of the vehicle can be estimated with high accuracy.

Supplementary Note 13

Provided is the vehicle that is capable of turning based on the difference between the vehicle wheel speed of the left driving wheel and the vehicle wheel speed of the right driving wheel, the vehicle including the vehicle control device according to any one of supplementary notes 1 to 12. In accordance with such a configuration, slippage of the left driving wheel and the right driving wheel can be suppressed.

Supplementary Note 14

Provided is the vehicle control method of controlling the vehicle including the left driving motor that drives the left driving wheel, and the right driving motor that drives the right driving wheel, the vehicle being capable of turning based on the difference between the vehicle wheel speed of the left driving wheel and the vehicle wheel speed of the right driving wheel, the vehicle control method including the target value setting step of setting the target vehicle speed and the target yaw rate, the understeering determination step of determining whether or not the vehicle is in the understeering state, based on the deviation between the yaw rate corresponding to the target yaw rate and the actual yaw rate of the vehicle, the correction value calculation step of calculating, in the case it is determined that the vehicle is in the understeering state, the correction value for causing the target vehicle speed to be corrected and lowered, the correction value being calculated based on the deviation, the target vehicle wheel speed setting step of setting the target vehicle wheel speed of the left driving wheel and the target vehicle wheel speed of the right driving wheel based on the target vehicle speed, the target yaw rate, and the correction value, and the rotational speed controlling step of controlling the rotational speed of the left driving motor based on the target vehicle wheel speed of the left driving wheel, and controlling the rotational speed of the right driving motor based on the target vehicle wheel speed of the right driving wheel. In accordance with such a configuration, in the case it is determined that the vehicle is in the understeering state, since the target vehicle speed is corrected and lowered by the correction value, the centrifugal force that acts on the vehicle becomes smaller, and an expansion of the turning radius of the vehicle can be suppressed.

Moreover, it should be noted that the present invention is not limited to the disclosure described above, and various configurations can be adopted therein without departing from the essence and gist of the present invention.

The invention claimed is:

1. A vehicle control device configured to control a vehicle including a left driving motor configured to drive a left driving wheel, and a right driving motor configured to drive a right driving wheel, the vehicle being configured to turn based on a difference between a vehicle wheel speed of the left driving wheel and a vehicle wheel speed of the right driving wheel, the vehicle control device comprising one or more processors that execute computer-executable instructions stored in a memory, wherein the one or more processors execute the computer-executable instructions to cause the vehicle control device to:

set a target vehicle speed and a target yaw rate;

determine whether or not the vehicle is in an understeering state, based on a deviation between a yaw rate corresponding to the target yaw rate and an actual yaw rate of the vehicle;

in a case it is determined that the vehicle is in the understeering state, calculate a correction value for causing the target vehicle speed to be corrected and lowered, the correction value being calculated based on the deviation;

set a target vehicle wheel speed of the left driving wheel and a target vehicle wheel speed of the right driving wheel based on the target vehicle speed, the target yaw rate, and the correction value; and control a rotational speed of the left driving motor based on the target vehicle wheel speed of the left driving wheel, and control a rotational speed of the right driving motor based on the target vehicle wheel speed of the right driving wheel.

2. The vehicle control device according to claim 1, wherein the one or more processors cause the vehicle control device to calculate, as the yaw rate corresponding to the target yaw rate, a nominal yaw rate which is an estimated value of a yaw rate that the vehicle is capable of generating while traveling on a dry asphalt road surface.

3. The vehicle control device according to claim 2, wherein the one or more processors cause the vehicle control device to delay a phase of the nominal yaw rate with respect to a phase of the target yaw rate.

4. The vehicle control device according to claim 3, wherein the one or more processors cause the vehicle control device to:

based on the target yaw rate and a differential value of the target yaw rate, determine whether a magnitude of the actual yaw rate is in a process of increasing or in a process of decreasing; and make a delay of the phase of the nominal yaw rate with respect to the phase of the target yaw rate in a case it is determined that the actual yaw rate is in the process of increasing, larger than a delay of the phase of the nominal yaw rate with respect to the phase of the target yaw rate in a case it is determined that the actual yaw rate is in the process of decreasing.

5. The vehicle control device according to claim 1, wherein the one or more processors cause the vehicle control device to limit an amount of change in the correction value based on the deviation.

6. The vehicle control device according to claim 1, wherein the one or more processors cause the vehicle control device to:

set an allowable slip range of the left driving wheel based on a left slip determination upper limit value and a left slip determination lower limit value for determining a slip of the left driving wheel based on the vehicle wheel speed of the left driving wheel, and set an allowable slip range of the right driving wheel based on a right slip determination upper limit value and a right slip determination lower limit value for determining a slip of the right driving wheel based on the vehicle wheel speed of the right driving wheel; and set the target vehicle wheel speed of the left driving wheel within a range corresponding to the allowable slip range of the left driving wheel based on the target vehicle speed, the target yaw rate, and the correction value, and set the target vehicle wheel speed of the right driving wheel within a range corresponding to the allowable slip range of the right driving wheel based on the target vehicle speed, the target yaw rate, and the correction value.

7. The vehicle control device according to claim 6, wherein the one or more processors cause the vehicle control device to:

set, according to the allowable slip range of the left driving wheel, a target vehicle wheel speed limit range for limiting the target vehicle wheel speed of the left driving wheel, and set, according to the allowable slip range of the right driving wheel, a target vehicle wheel speed limit range for limiting the target vehicle wheel speed of the right driving wheel;

set the target vehicle wheel speed of the left driving wheel within the target vehicle wheel speed limit range of the left driving wheel based on the target vehicle speed, the target yaw rate, and the correction value, and set the target vehicle wheel speed of the right driving wheel within the target vehicle wheel speed limit range of the right driving wheel based on the target vehicle speed, the target yaw rate, and the correction value;

in a case that the vehicle wheel speed of the left driving wheel lies within the allowable slip range of the left driving wheel, and further, the vehicle wheel speed of the right driving wheel lies within the allowable slip range of the right driving wheel, set the target vehicle wheel speed limit range of the left driving wheel to a range that is larger than the allowable slip range of the left driving wheel, and set the target vehicle wheel speed limit range of the right driving wheel to a range that is larger than the allowable slip range of the right driving wheel; and in a case that the vehicle wheel speed of the left driving wheel lies outside of the allowable slip range of the left driving wheel, or the vehicle wheel speed of the right driving wheel lies outside of the allowable slip range of the right driving wheel, set the target vehicle wheel speed limit range of the left driving wheel to a same range as the allowable slip range of the left driving wheel, and set the target vehicle wheel speed limit range of the right driving wheel to a same range as the allowable slip range of the right driving wheel.

8. The vehicle control device according to claim 7, wherein
in a case that a transition is made from a state in which the vehicle wheel speed of the left driving wheel lies within the allowable slip range of the left driving wheel, and further, the vehicle wheel speed of the right driving wheel lies within the allowable slip range of the right driving wheel, to a state in which the vehicle wheel speed of the left driving wheel lies outside of the allowable slip range of the left driving wheel, or the vehicle wheel speed of the right driving wheel lies outside of the allowable slip range of the right driving wheel, the one or more processors cause the vehicle control device to gradually bring the target vehicle wheel speed limit range of the left driving wheel closer to the allowable slip range of the left driving wheel, and gradually bring the target vehicle wheel speed limit range of the right driving wheel closer to the allowable slip range of the right driving wheel.

9. The vehicle control device according to claim 7, wherein
in a case that a transition is made from a state in which the vehicle wheel speed of the left driving wheel lies outside of the allowable slip range of the left driving wheel, or the vehicle wheel speed of the right driving wheel lies outside of the allowable slip range of the right driving wheel, to a state in which the vehicle wheel speed of the left driving wheel lies within the allowable slip range of the left driving wheel, and further, the vehicle wheel speed of the right driving wheel lies within the allowable slip range of the right driving wheel, the one or more processors cause the vehicle control device to gradually increase the target vehicle wheel speed limit range of the left driving wheel, and gradually increase the target vehicle wheel speed limit range of the right driving wheel.

10. The vehicle control device according to claim 6, wherein
the one or more processors cause the vehicle control device to:
estimate a vehicle body speed, a left road surface coefficient that is a road surface coefficient between the left driving wheel and a ground contact road surface, and a right road surface coefficient that is a road surface coefficient between the right driving wheel and a ground contact road surface, based on a rotational speed of the left driving wheel, a driving torque of the left driving wheel, a rotational speed of the right driving wheel, a driving torque of the right driving wheel, a frontward/rearward acceleration of the vehicle, and the actual yaw rate; and
set the left slip determination upper limit value and the left slip determination lower limit value based on a vehicle body speed estimated value that is the vehicle body speed that has been estimated, and a left road surface coefficient estimated value that is the left road surface coefficient that has been estimated, and set the right slip determination upper limit value and the right slip determination lower limit value based on the vehicle body speed estimated value, and a right road surface coefficient estimated value that is the right road surface coefficient that has been estimated.

11. The vehicle control device according to claim 10, wherein the one or more processors cause the vehicle control device to:
based on a dynamic model of the vehicle, a dynamic model of the left driving wheel, and a dynamic model of the right driving wheel, set a first state equation that includes, as state quantities, the vehicle body speed estimated value, the left road surface coefficient estimated value, and the right road surface coefficient estimated value, and an observation equation that includes, as observed quantities, an observed value of the rotational speed of the left driving wheel, an observed value of the rotational speed of the right driving wheel, an observed value of the frontward/rearward acceleration of the vehicle, and an observed value of the actual yaw rate; and
process the first state equation and the observation equation using a first parameter estimation method to thereby estimate the vehicle body speed, the left road surface coefficient, and the right road surface coefficient.

12. The vehicle control device according to claim 11, wherein
the first state equation includes an estimated value of an angle of inclination of the vehicle, and
the one or more processors cause the vehicle control device to:
based on the dynamic model of the vehicle, set a second state equation that includes an estimated value of the angle of inclination as a state quantity, and an observation relational expression indicating a relationship between an observed value of the angle of inclination and an observed value of an acceleration of the vehicle; and
process the second state equation and the observation relational expression using a second parameter estimation method to thereby estimate the angle of inclination.

13. A vehicle comprising the vehicle control device according to claim 1, and configured to turn based on a difference between the vehicle wheel speed of the left driving wheel and the vehicle wheel speed of the right driving wheel.

14. A vehicle control method of controlling a vehicle including a left driving motor configured to drive a left driving wheel, and a right driving motor configured to drive a right driving wheel, the vehicle being configured to turn based on a difference between a vehicle wheel speed of the left driving wheel and a vehicle wheel speed of the right driving wheel, the vehicle control method comprising:
setting a target vehicle speed and a target yaw rate;
determining whether or not the vehicle is in an understeering state, based on a deviation between a yaw rate corresponding to the target yaw rate and an actual yaw rate of the vehicle;
calculating, in a case it is determined that the vehicle is in the understeering state, a correction value for causing the target vehicle speed to be corrected and lowered, the correction value being calculated based on the deviation;
setting a target vehicle wheel speed of the left driving wheel and a target vehicle wheel speed of the right driving wheel based on the target vehicle speed, the target yaw rate, and the correction value; and
controlling a rotational speed of the left driving motor based on the target vehicle wheel speed of the left driving wheel, and controlling a rotational speed of the right driving motor based on the target vehicle wheel speed of the right driving wheel.

* * * * *